United States Patent
Sawada et al.

(10) Patent No.: US 9,278,609 B2
(45) Date of Patent: Mar. 8, 2016

(54) SUNROOF APPARATUS

(71) Applicant: AISIN SEIKI KABUSHIKI KAISHA, Kariya-shi, Aichi-ken (JP)

(72) Inventors: Kazuki Sawada, Handa (JP); Katsuyoshi Iwashita, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/535,480

(22) Filed: Nov. 7, 2014

(65) Prior Publication Data
US 2015/0130225 A1  May 14, 2015

(30) Foreign Application Priority Data
Nov. 8, 2013 (JP) .................................. 2013-232235

(51) Int. Cl.
*B60J 7/043* (2006.01)
*B60J 7/02* (2006.01)

(52) U.S. Cl.
CPC ............... *B60J 7/0435* (2013.01); *B60J 7/024* (2013.01)

(58) Field of Classification Search
CPC ............................... B60J 7/0435; B60J 7/024
USPC .................. 296/216.02–216.05, 220.01, 223
See application file for complete search history.

(56) References Cited

U.S. PATENT DOCUMENTS

| | | |
|---|---|---|
| 6,957,851 B2 | 10/2005 | Manders et al. |
| 7,125,070 B2 | 10/2006 | Sawada et al. |
| 8,474,906 B2 | 7/2013 | Sawada |

FOREIGN PATENT DOCUMENTS

JP    2012-153335    8/2012

*Primary Examiner* — Dennis H Pedder
(74) *Attorney, Agent, or Firm* — Finnegan, Henderson, Farabow, Garrett & Dunner, LLP

(57) ABSTRACT

A sunroof apparatus includes: a movable panel adjusted to open and close an opening formed on a roof of a vehicle; a guide rail extending on the roof in the vehicle front-rear direction; a driving shoe driven to move along the guide rail; a support bracket including a first engagement protrusion and a second engagement protrusion and supporting the movable panel; a rear-side guide member on which a guide-side engagement concave portion is formed and which is provided on the guide rail; and a rear-side link from which a link-side engagement protrusion which engages with the guide-side engagement concave portion to lift up and lower the rear portion of the support bracket protrudes in the vehicle width direction.

8 Claims, 14 Drawing Sheets

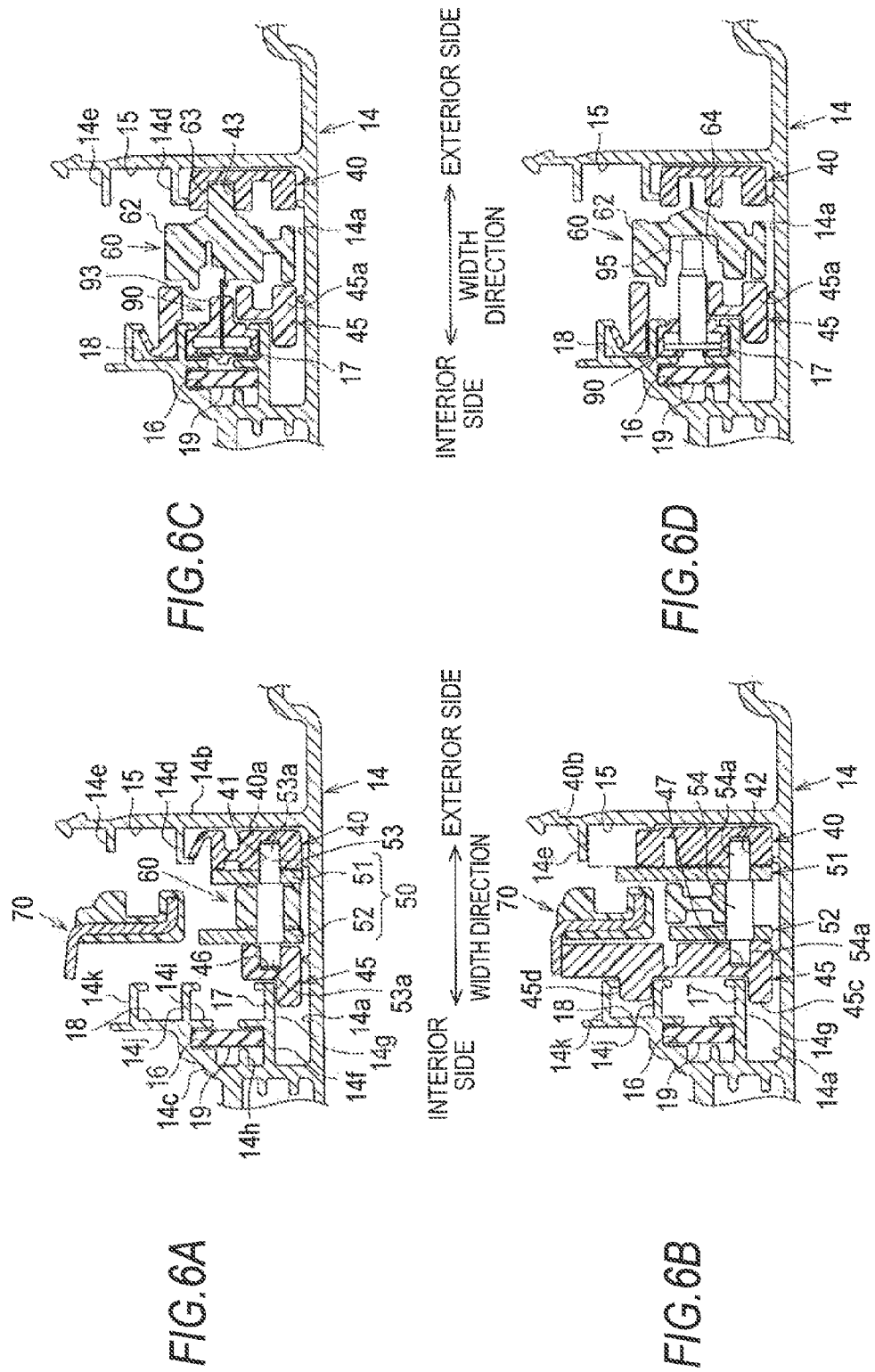

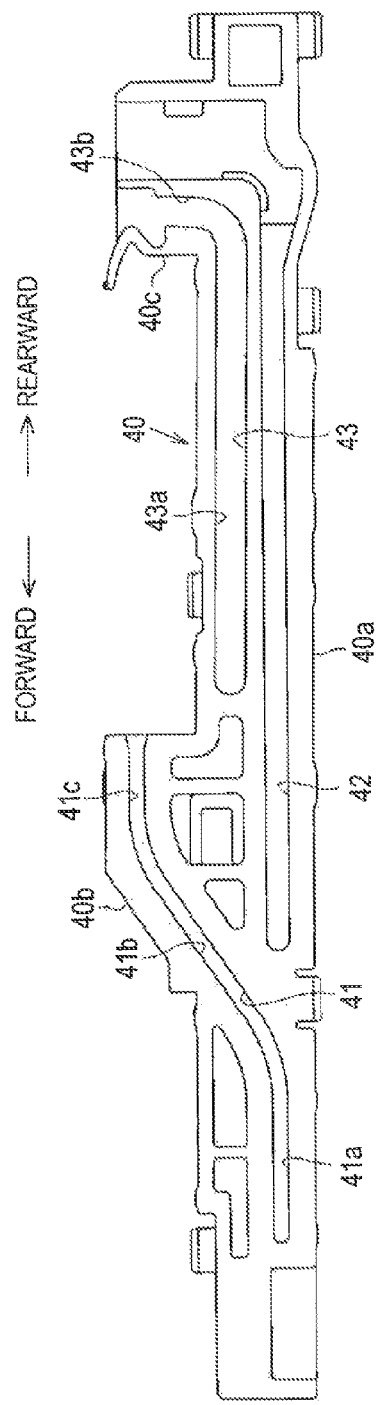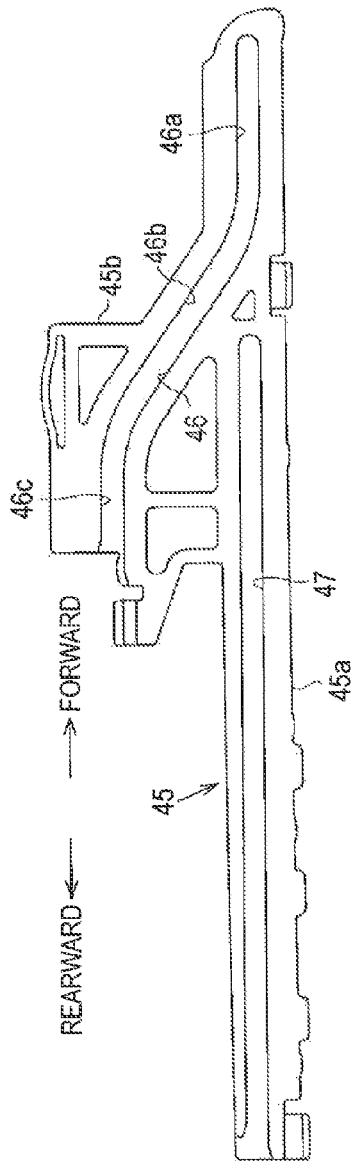

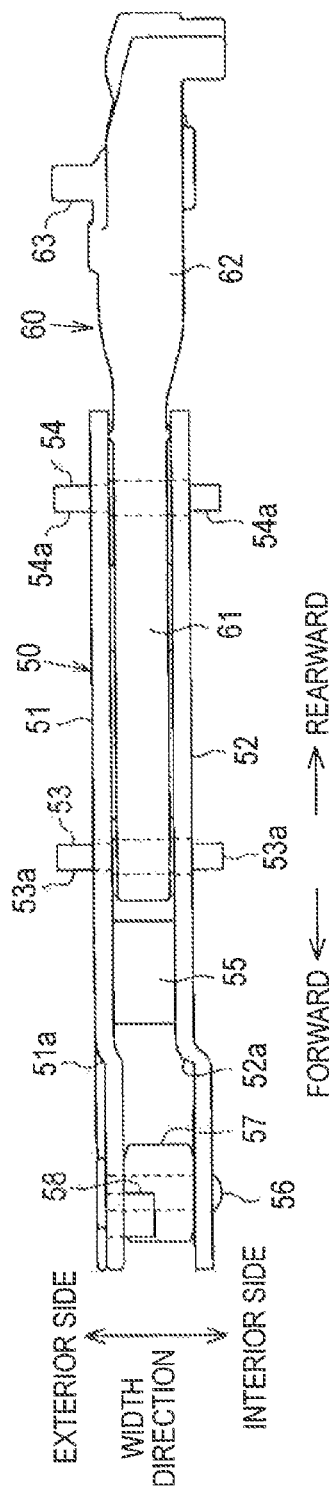
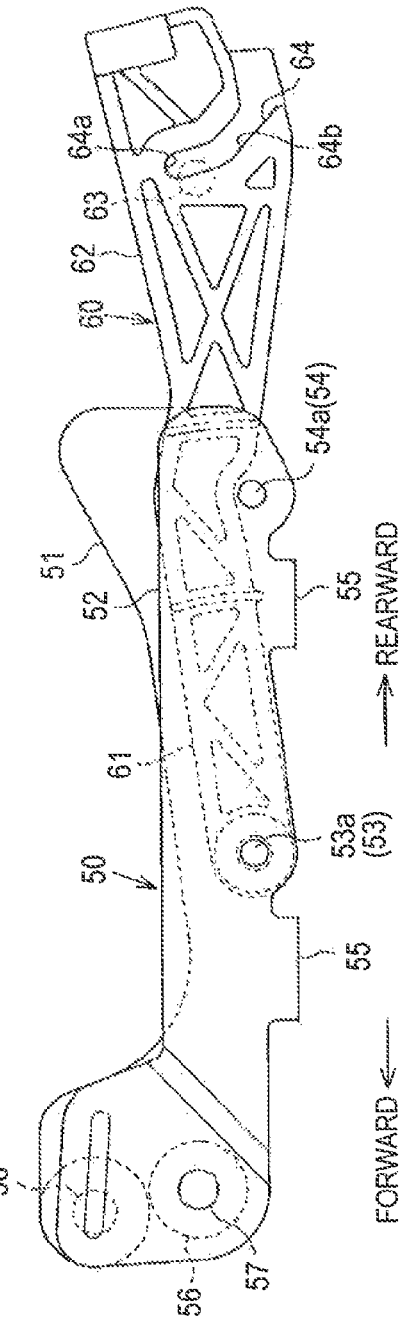
FIG.9A
FIG.9B

FORWARD ← → REARWARD

FORWARD ← → REARWARD

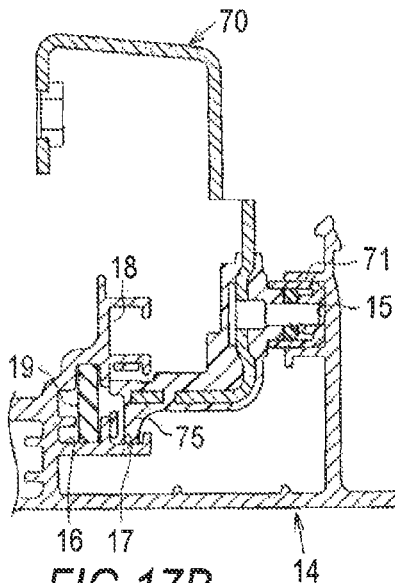
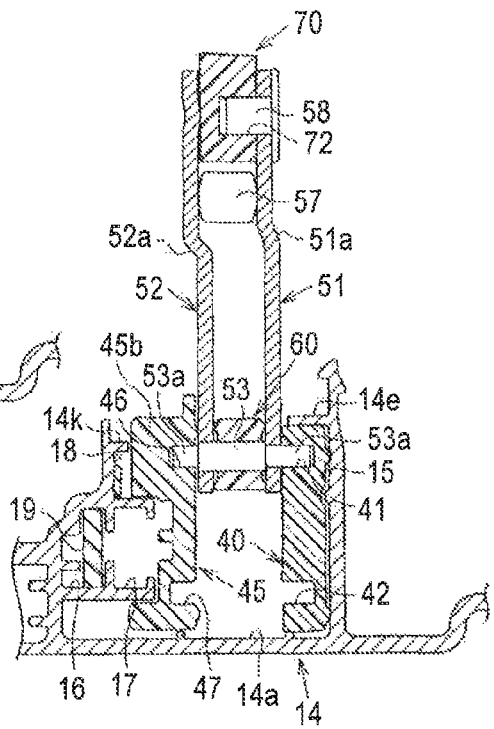
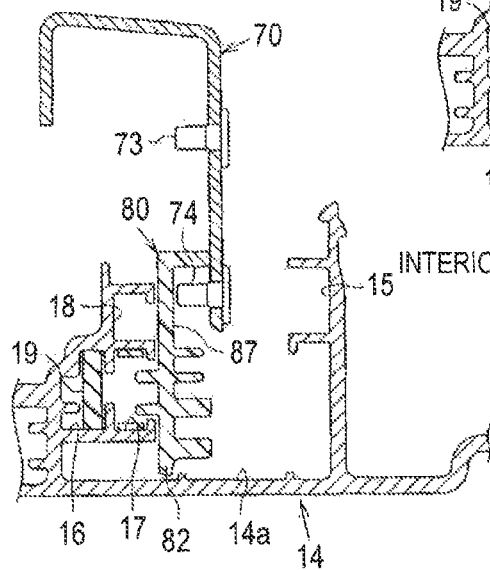
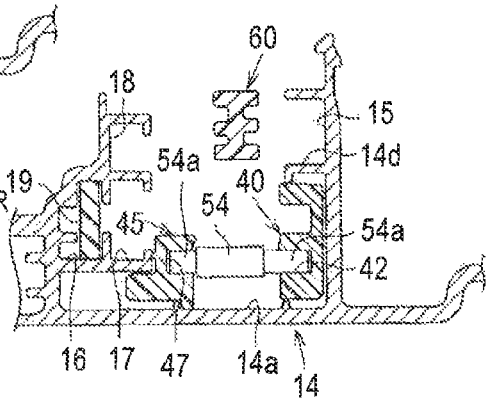
FIG.17A
FIG.17C
FIG.17B
FIG.17D

SUNROOF APPARATUS

CROSS REFERENCE TO RELATED APPLICATIONS

This application is based on and claims priority under 35 U.S.C. §119 to Japanese Patent Application 2013-232235, filed on Nov. 8, 2013, the entire contents of which are incorporated herein by reference.

TECHNICAL FIELD

This disclosure relates to a sunroof apparatus that is mounted in a vehicle.

BACKGROUND DISCUSSION

In the related art, a sunroof apparatus disclosed in JP 2012-153335A (FIGS. 9A and 9C) (Reference 1) is known. The sunroof apparatus is configured to have a support bracket that supports a movable panel, a guide rail that extends on the roof of a vehicle in the front-rear direction, a driving shoe that is driven to move along the guide rail in the vehicle front-rear direction, a front-side link, a front-side guide member, a check member, a rear-side link, and a rear-side guide member. The front-side link is linked rotatably to the front portion of the support bracket and engaged with the driving shoe. The front-side guide member is fixed to the guide rail, controls rearward movement of the support bracket and the front-side link, in the vehicle, when an amount of the rearward movement of the driving shoe with a completely-closed state of the movable panel as a starting point is a first predetermined amount or less, and guides the front portion of the support bracket and the front portion of the front-side link to be lifted together when the amount of the rearward movement of the driving shoe exceeds the first predetermined amount. When the amount of the rearward movement of the driving shoe is a second predetermined amount or greater, which is greater than the first predetermined amount, the front-side link is engaged with the driving shoe such that the front-side link and the driving shoe integrally move rearward along with the support bracket.

When the amount of the rearward movement of the driving shoe is less than the second predetermined amount, the check member engages with the driving shoe such that the check member and the driving shoe integrally move rearward and when the amount of the rearward movement of the driving shoe is the second predetermined amount or greater, the check member disengages from the driving shoe. The rear-side link is linked rotatably to the check member and slidably supports a portion rearward from a link portion to the front-side link of the support bracket in the vehicle front-rear direction. The rear-side guide member is fixed to the guide rail and guides the rear-side link to tilt such that the rear portion of the support bracket is lifted when the amount of the rearward movement of the driving shoe is the first predetermined amount or less.

In this configuration, when the driving shoe moves rearward in an amount of the movement equal to or less than the first predetermined amount in the completely-closed state of the movable panel, the check member and the rear-side link move rearward along with the driving shoe, and thereby the rear-side guide member guides the rear-side link to tilt such that the rear portion of the support bracket is lifted. In the support bracket, the rear portion is lifted with the front portion, of which the movement is regulated by the front-side guide member, as a fulcrum center, and the movable panel is tilted up.

In addition, in the tilted up state of the movable panel, when the driving shoe moves further rearward and the amount of the movement becomes the second predetermined amount or greater, the driving shoe and the check member disengage from each other and the driving shoe moves rearward along with front-side link and the support bracket while the check member and the rear-side link remain at their positions and an opening operation of the movable panel is performed such that the movable panel is in a wide-open state. In a range of the amount of the movement of the driving shoe from the first predetermined amount to the second predetermined amount, the front portion of the support bracket and the front portion of the front-side link are guided to be lifted by the front-side guide member such that the regulation of the rearward movement of the support bracket and the front-side link is released.

Incidentally, in Reference 1, the driving shoe and the rear-side guide member are disposed at different positions from each other in the width direction when viewed in the vehicle front-rear direction, which results in an increase in the size of the guide rail in the vehicle width direction.

Meanwhile, the present inventors have examined a disposition of the driving shoe and the rear-side guide member which are to be overlapped with each other at a position in the width direction when viewed in the vehicle front-rear direction. However, in this case, the driving shoe and the rear-side guide member are required to be shifted in the vehicle height direction such that the amount of the required rearward movement of the driving shoe is not limited by the rear-side guide member, which results in an increase in the size of the entire apparatus in the vehicle height direction. In particular, a single guide hole of the driving shoe that engages with a guide pin of the front-side link functions to allow the rear portion of the support bracket to be lifted up and lowered and to cause the front portion of the support bracket to be lifted up and lowered and then to move integrally in the vehicle front-rear direction. Therefore, the size required for the guide hole is added in the vehicle height direction, and thus the driving shoe itself is increased in size in the vehicle height direction. Therefore, the entire apparatus has a still more increased size in the vehicle height direction.

SUMMARY

Thus, a need exists for a sunroof apparatus which is not suspectable to the drawback mentioned above.

An aspect of this disclosure is directed to a sunroof apparatus including: a movable panel that is adjusted to open and close an opening formed on a roof of a vehicle; a guide rail that extends on the roof in the vehicle front-rear direction; a driving shoe that is driven to move along the guide rail; a support bracket that includes a first engagement protrusion and a second engagement protrusion and supports the movable panel; a rear-side guide member on which a guide-side engagement concave portion is formed and which is provided on the guide rail; and a rear-side link from which a link-side engagement protrusion which engages with the guide-side engagement concave portion to lift up and lower the rear portion of the support bracket protrudes in the vehicle width direction. On the driving shoe, a first driving shoe-side engagement concave portion that is capable of engaging with the first engagement protrusion to allow the rear portion of the support bracket to be lifted up and lowered and a second driving shoe-side engagement concave portion that is capable of engaging with the second engagement protrusion to cause the front portion of the support bracket to be lifted up and lowered and the support bracket to move integrally with the driving shoe in the vehicle front-rear direction are formed.

The first and second driving shoe-side engagement concave portions and the guide-side engagement concave portion are overlapped with each other at a position in the width direction and a part of the guide-side engagement concave portion with which the link-side engagement protrusion engages in a completely-closed state of the movable panel is disposed above or below the first driving shoe-side engagement concave portion in the vehicle height direction in a wide-open state of the movable panel.

In this configuration, the driving shoe and the rear-side guide member are disposed in a state in which the first and second driving shoe-side engagement concave portions and the guide-side engagement concave portions are overlapped with each other at a position in the width direction, that is, a state of sharing a space in the width direction. Therefore, it is possible to suppress an increase in the size of the guide rail in the width direction. In addition, in the driving shoe and the rear-side guide member, a part of the guide-side engagement concave portion with which the link-side engagement protrusion engages in a completely-closed state of the movable panel is disposed above or below the first driving shoe-side engagement concave portion in the vehicle height direction in a wide-open state of the movable panel. Therefore, interference between the driving shoe and the rear-side guide member is prevented and also it is possible to suppress an increase in the size of the entire apparatus in the vehicle height direction. In particular, the first driving shoe-side engagement concave portion for allowing the rear portion of the support bracket to be lifted up and lowered and the second driving shoe-side engagement concave portion for causing the front portion of the support bracket to be lifted up and lowered and the support bracket to move integrally with the driving shoe in the vehicle front-rear direction are independently formed from each other on the driving shoe. Therefore, it is possible to simultaneously reduce the dimensions required for the first driving shoe-side engagement concave portion and the second driving shoe-side engagement concave portion in the vehicle height direction and thus, it is possible to further miniaturize the driving shoe in the vehicle height direction.

The aspect of this disclosure has an effect in that the guide rail is further miniaturized in the width direction and thus it is possible to suppress an increase in the size of the entire apparatus in the vehicle height direction.

BRIEF DESCRIPTION OF THE DRAWINGS

The foregoing and additional features and characteristics of this disclosure will become more apparent from the following detailed description considered with the reference to the accompanying drawings, wherein:

FIGS. 6A, 6B, 6C, and 6D are cross-sectional views taken along line 6A-6A, line 6B-6B, line 6C-6C, and line 6D-6D in FIG. 5, respectively;

FIGS. 8A and 8B are side views illustrating rear-side guide members on the exterior side and on the interior side in the vehicle width direction, respectively;

FIGS. 9A and 9B are a plan view and a side view illustrating a rear-side link member and a check member linked thereto, respectively;

FIGS. 17A, 17B, 17C, and 17D are cross-sectional views taken along line 17A-17A, line 17B-17B, line 17C-17C, and line 17D-17D in FIG. 16, respectively.

DETAILED DESCRIPTION

Hereinafter, an embodiment of a sunroof apparatus is described. From here on, a vehicle front-rear direction is referred to as "front-rear direction" and the upper side and the lower side in the vehicle height direction are referred to as "upper side" and "lower side", respectively. In addition, the interior side in the vehicle width direction toward the interior of the vehicle is referred to as "interior side" and the exterior side in the vehicle width direction toward the exterior of the vehicle is referred to as "the exterior side".

Figure 1:
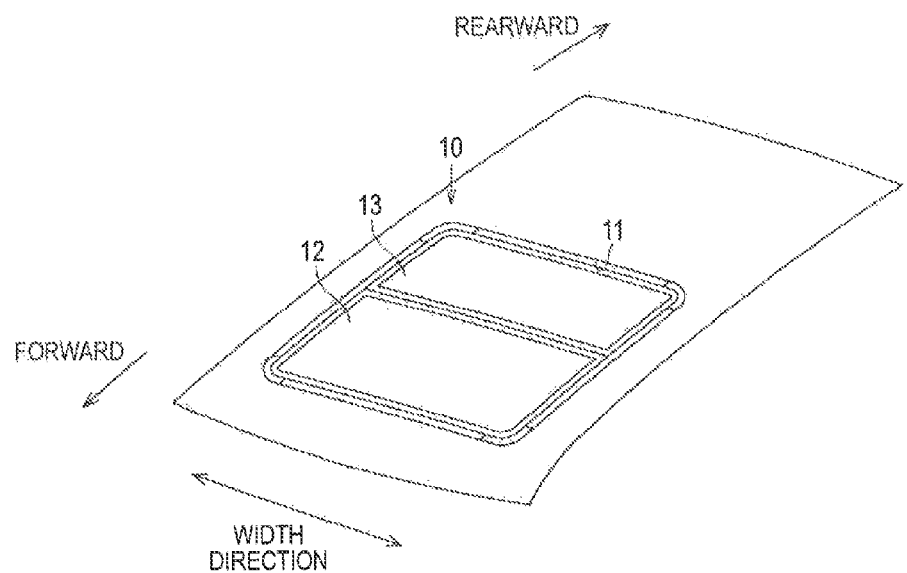
FIG. 1 is a perspective view illustrating a roof of the vehicle in a completely-closed state of a movable panel.
Figure 2:
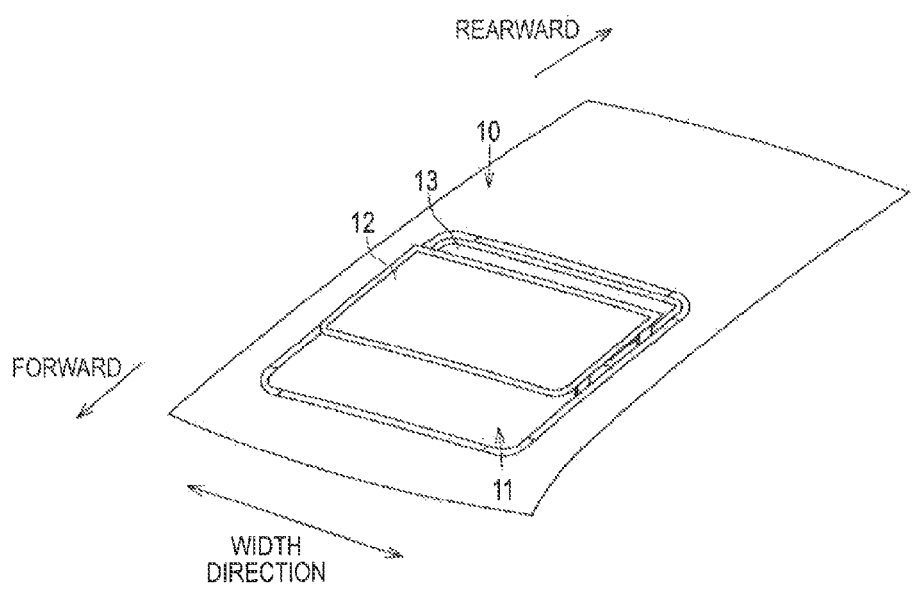
FIG. 2 is a perspective view illustrating the roof of the vehicle in an opening state of the movable panel.

As illustrated in FIGS. 1 and 2, on a roof 10 of the vehicle such as an automobile, a substantially quadrilateral opening 11 is formed and both substantially quadrilateral movable panel 12 and fixed panel 13 which are formed of a glass plate, for example, are disposed. The movable panel 12 is attached to have an openable and closable front portion of the opening 11. That is, the movable panel 12 is attached so as to be capable of a tilted up operation in which the rear-side portion thereof is lifted with the front-side portion thereof as a fulcrum point, a pop-up operation in which the front-side portion and the rear-side portion are lifted together, and a sliding operation in the front-rear direction. A so-called outer sliding method in which the sliding operation is performed while maintaining the pop-up state is employed in an opening and closing operation of the front portion of the opening 11 in the movable panel 12. Meanwhile, the fixed panel 13 is attached such that the rear portion of the opening 11 is normally closed.

Figure 4:
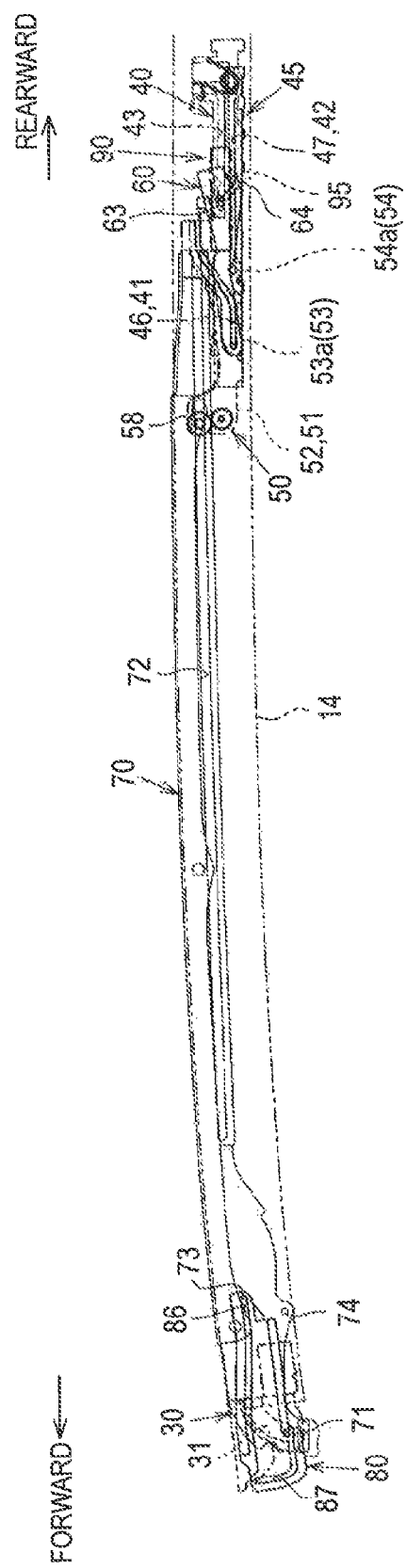
FIG. 4 is a side view illustrating the embodiment.

Next, a structure related to the opening and closing operation or the like of the movable panel 12 will be described. Since two structures in the vehicle width direction are basically symmetrical (horizontal symmetry), only one side in the vehicle width direction will be described below. In FIG. 4, each member is illustrated by using a different type of line for the sake of convenience.

Figure 3:
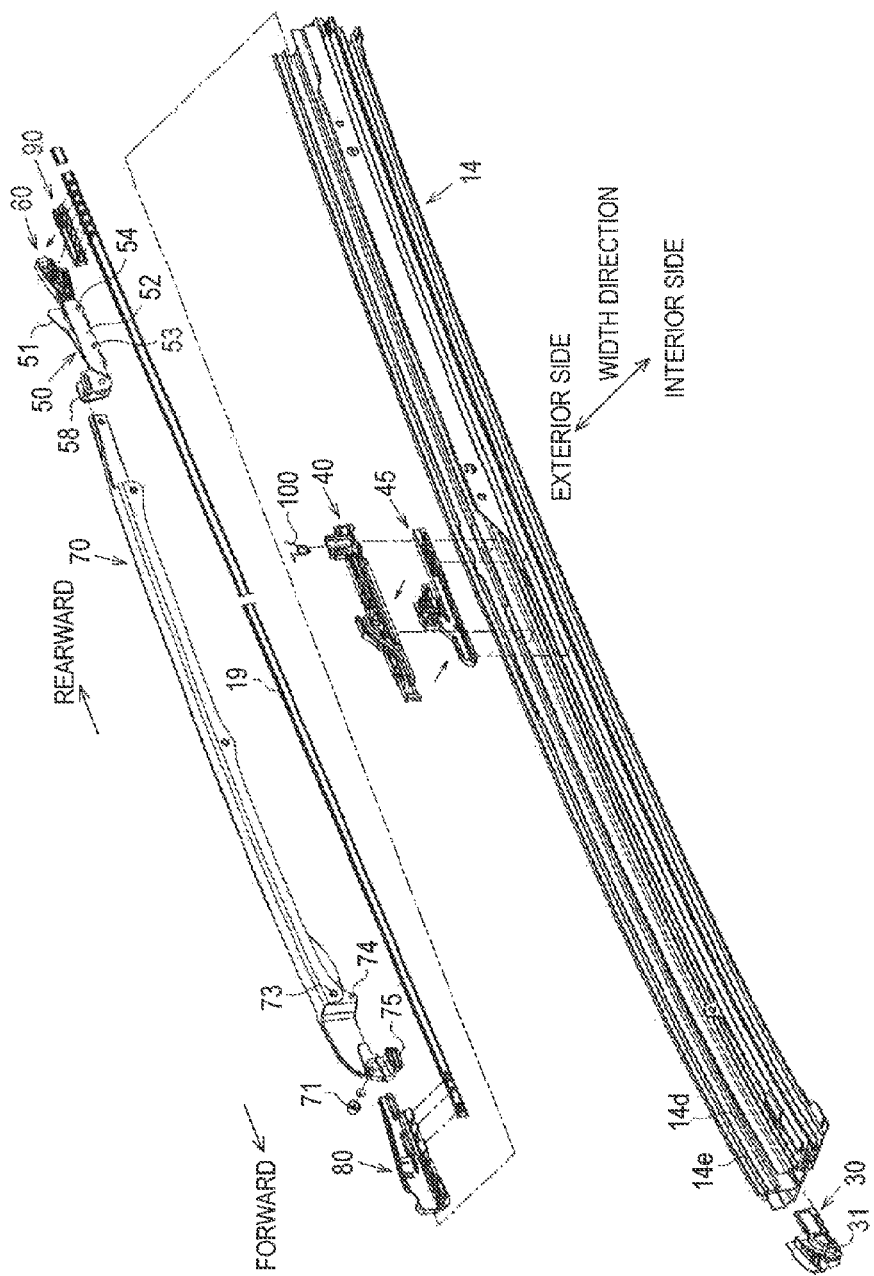
FIG. 3 is an exploded perspective view illustrating an embodiment of this disclosure.
Figure 5:
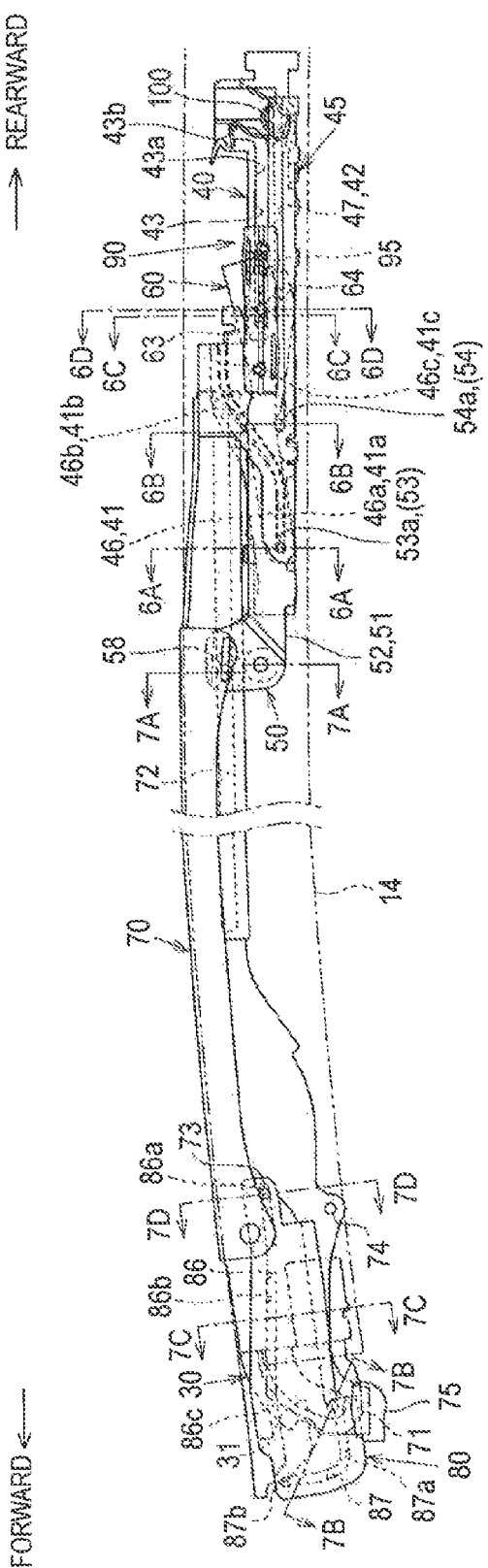
FIG. 5 is a side view illustrating the embodiment in the completely-closed state of the movable panel when viewed from the interior side in the vehicle width direction.

As illustrated in FIGS. 3 to 5, a guide rail 14 is provided at each edge of the opening 11 in the vehicle width direction. The guide rail 14 is formed of an extruded material of an aluminum alloy, for example, has a constant cross section in the longitudinal direction thereof, and extends in the front-rear direction. That is, as illustrated in FIG. 6A, the guide rail 14 has a substantially lengthy bottom wall 14a that extends in the front-rear direction (direction orthogonal to paper surface in FIG. 6), has a vertical wall portion 14b provided to be upright from the bottom wall 14a, and has a vertical wall portion 14c having a substantial crank-like cross section which is provided to be upright from the bottom wall 14a further inside in the interior side from the vertical wall portion 14b.

In addition, the guide rail 14 has a support wall portion 14d having a substantial L-shaped cross section as a second regulation piece which extends to the interior side from the intermediate portion of the vertical wall portion 14b in the vehicle height direction and has a flange 14e as the second regulation piece that extends to the interior side from the vertical wall portion 14b on the upper side of the support wall portion 14d. As illustrated in FIG. 6C, both tips of the support wall portion 14d and the flange 14e are disposed basically at the same position as each other in the vehicle width direction (width direction of the guide rail 14) when viewed in the front-rear direction.

Further, the guide rail 14 has a support wall portion 14f having a substantial L-shaped cross section that extends to the exterior side from the lower end portion of the vertical wall portion 14c, has a support wall portion 14g having a substantial L-shaped cross section that extends further to the exterior side from the support wall portion 14f, and has a flange 14h that extends to the exterior side from the vertical wall portion 14c on the upper side of the support wall portion 14f. In addition, the guide rail 14 has a flange 14i that extends to the lower side facing the tip of the support wall portion 14f from the intermediate portion of the vertical wall portion 14c in the vehicle height direction and has a support wall portion 14 having a substantial L-shaped cross section which extends to the exterior side from the base end of the flange 14i. In addition, the guide rail 14 has a support wall portion 14k having a substantial L-shaped cross section as a first regulation piece which extends to the exterior side from the vertical wall portion 14c on the upper side of the support wall portion 14j. The tips of the support wall portions 14g, 14j, and 14k are disposed basically at the same position as each other in the vehicle width direction (width direction of the guide rail 14) when viewed in the front-rear direction.

The guide rail 14 forms a first rail section 15 having a substantial U-shaped cross section which opens to the interior side in cooperation with the vertical wall portion 14b, the support wall portion 14d, and the flange 14e. In addition, the guide rail 14 forms a second rail section 16 having a substantial E-shaped cross section which opens to the exterior side in cooperation with the vertical wall portion 14c, the support wall portion 14f and the flanges 14h and 14i. In addition, the guide rail 14 forms a third rail section 17 having a substantial U-shaped cross section which opens to the interior side in cooperation with the support wall portions 14g and 14j, and the flange 14i. In addition, the guide rail 14 forms a fourth rail section 18 having a substantial U-shaped cross section which opens to the exterior side in cooperation with the vertical wall portion 14c, the support wall portions 14j and 14k. The first rail section 15 is disposed on the upper side closer to the exterior side of the bottom wall 14a. Meanwhile, the second rail section 16 is disposed on the upper side closer to the interior side of the bottom wall 14a. In addition, the third rail section 17 is disposed adjacent to the exterior side of the second rail section 16. Meanwhile, the fourth rail section 18 is disposed on the upper side of the third rail section 17. That is, the third and fourth rail sections 17 and 18 that share the support wall portion 14 are disposed to have the same position in the vehicle width direction when viewed in the front-rear direction.

As illustrated in FIGS. 3 to 5, a front-side guide member 30 that is formed of a resin material is attached to the front end portion of the guide rail 14. The front-side guide member 30 is fitted into the guide rail 14 at a portion of the bottom wall 14a on the exterior side which is on the lower side of the support wall portion 14d and a guide groove 31 that opens to the interior side is formed at the substantially fan-like front end portion which extends forward from the guide rail 14. The guide groove 31 is formed in a substantial arc shape extending diagonally toward the upper rear side, the front end thereof is blocked, and the rear end thereof is opened. The front end of the guide groove 31 is positioned downward from the support wall portion 14d of the guide rail 14 and the rear end thereof communicates with the first rail section 15.

At the intermediate portion of the guide rail 14 in the longitudinal direction, a pair of rear-side guide members 40 and 45 which are formed of a resin material are attached spaced apart from each other in the vehicle width direction.

As illustrated along with in FIG. 8A, the rear-side guide member 40 on the exterior side as a second rear-side guide member has a lengthy main body 40a that extends in the front-rear direction, has a substantially trapezoidal slope portion 40b that extends upward from the intermediate portion of the main body 40a in the longitudinal direction, and further has a substantially column-like upright portion 40c that protrudes upward from the rear end of the main body 40a. As illustrated in FIGS. 6A and 6B, the main body 40a of the rear-side guide member 40 is fitted into the guide rail 14 at a portion of the bottom wall 14a on the exterior side which is on the lower side of the support wall portion 14d. In addition, the slope portion 40b of the rear-side guide member 40, which protrudes upward through a notch formed on the support wall portion 14d, is fitted into the guide rail 14 along with the main body 40a at a portion of the bottom wall 14a on the exterior side which is on the lower side of the flange 14e. In addition, the upright portion 40c protrudes upward through the notch formed on the support wall portion 14d and, similarly, is fitted into the guide rail 14. In this state, the movement of the rear-side guide member 40 to the exterior side is regulated by the guide rail 14 (vertical wall portion 14b). In addition, the movement of the rear-side guide member 40 in the front-rear direction is regulated by the slope portion 40b or the like which passes through the support wall portion 14d.

As illustrated in FIG. 8A, on the rear-side guide member 40, a guide groove 41 as a second guide-side engagement concave portion that opens to the interior side is formed along the slope portion 40b and the main body 40a disposed forward from the slope portion 40b. The guide groove 41 has a front-side groove portion 41a that extends in the front-rear direction, a sloped groove portion 41b that is connected to the rear end of the front-side groove portion 41a and extends diagonally toward the upper rear side, and a rear-side groove portion 41c that is connected to the rear end of the sloped groove portion 41b and extends in the front-rear direction. The front end of the front-side groove portion 41a is blocked.

In addition, on the rear-side guide member 40, a guide groove 42 as a second guide-side engagement concave portion that opens to the interior side is formed along the main body 40a disposed rearward from the front-side groove portion 41a. This guide groove 42 extends in the front-rear direction at the same position as the front-side groove portion 41a in the vehicle height direction.

Further, on the rear-side guide member 40, a guide groove 43 as the guide-side engagement concave portion that opens to the interior side is formed along the main body 40a and the upright portion 40c. This guide groove 43 has a rear-side groove portion 43b that is connected to the front-side groove portion 43a and the rear end of the front-side groove portion 43a that extends in the front-rear direction on the rear side of the sloped groove portion 41b and on the upper side of the guide groove 42 and extends upward. The front end of the front-side groove portion 43a is blocked.

As illustrated in FIG. 6B, the flange 14e that comes into contact with the top surface of the slope portion 40b is in a state of extending above the guide groove 42 of the rear-side guide member 40 in the vehicle width direction when viewed in the front-rear direction. The flange 14e and the guide grooves 41 and 43 have the same dispositional relationship. Otherwise, the support wall portion 14d that comes into contact with the top surface of the main body 40a on the front or rear side of the slope portion 40b and the guide grooves 41 to 43 have the same dispositional relationship. That is, the rear-side guide member 40 comes into contact with the guide rail 14 (the support wall portion 14d or the flange 14e) above the guide grooves 41 to 43.

Meanwhile, as illustrated along with in FIG. 8B, the rear-side guide member 45 on the interior side has a lengthy main body 45a that extends in the front-rear direction and has a substantially rectangular upright portion 45b that protrudes upward from the intermediate portion of the main body 45a in the longitudinal direction. In addition, as illustrated in FIGS. 6A and 6B, the rear-side guide member 45 has a lower-side fitting protrusion 45c that protrudes to the interior side from the lower end of the main body 45a and has an upper-side fitting protrusion 45d that protrudes to the interior side from the upright portion 45b. The lower-side fitting protrusion 45c is provided between the support wall portion 14g and the bottom wall 14a and the upper-side fitting protrusion 45d is provided between the support wall portions 14j and 14k (fourth rail section 18) such that the rear-side guide member 45 is fitted into the guide rail 14. In this state, the movement of the rear-side guide member 45 to the interior side is regulated by the guide rail 14 (support wall portions 14g, 14j, and 14k). In addition, the upright portion 45b extends upward through the notch formed on the support wall portion 14k and thereby the movement of the rear-side guide member 45 in the front-rear direction is regulated (refer to FIG. 17C).

As illustrated in FIG. 8B, on the rear-side guide member 45, a guide groove 46 as a guide-side engagement concave portion that opens to the exterior side is formed along the upright portion 45b and the main body 45a disposed forward from the upright portion 45b. The guide groove 46 has the same shape as the guide groove 41 except that the guide groove 46 is vertically symmetrical. The guide groove 46 has a front-side groove portion 46a, a sloped groove portion 46b, and a rear-side groove portion 46c.

In addition, on the rear-side guide member 45, a guide groove 47 as a guide-side engagement concave portion that opens to the exterior side is formed along the main body 45a disposed rearward from the front-side groove portion 46a. This guide groove 47 has the same shape as the guide groove 42 except that the guide groove 47 is vertically symmetrical.

As illustrated in FIG. 6B, the support wall portion 14k that comes into contact with the top surface of the upper-side fitting protrusion 45d is in a state of not extending above the guide groove 47 of the rear-side guide member 45 in the vehicle width direction. The support wall portion 14k and the guide groove 46 have the same dispositional relationship. The support wall portion 14g that comes into contact with the top surface of the lower-side fitting protrusion 45c and the guide grooves 46 and 47 have the same dispositional relationship.

That is, the rear-side guide member 45 does not come into contact with the guide rail 14 above the guide grooves 46 and 47.

As illustrated in FIGS. 6A and 6B, a rear-side link member 50 that is formed of, for example, a steel sheet is supported by both of the rear-side guide members 40 and 45. The rear-side link member 50 has a pair of rear-side links 51 and 52 which are provided between both of the rear-side guide members 40 and 45. Both of the rear-side links 51 and 52 are provided side by side in the vehicle width direction to be parallel to each other. As illustrated in FIGS. 9A and 9B, both ends of a pair of front and rear link-side engagement pins 53 and 54 which pass through both of the rear-side links 51 and 52 are pressed into and fixed to both of the rear-side links 51 and 52, respectively. The ends of the link-side engagement pins 53 and 54 form link-side engagement protrusions 53a and 54a, respectively. The link-side engagement pin 53 is disposed at the intermediate portion of both of the rear-side links 51 and 52 in the front-rear direction and the link-side engagement pin 54 is disposed rearward from the link-side engagement pin 53.

Thus, as illustrated in FIGS. 6A and 6B, both of the link-side engagement protrusions 53a of the front-side link-side engagement pin 53 are inserted slidably into the guide grooves 41 and 46 of both of the rear-side guide members 40 and 45, respectively. In addition, both of the link-side engagement protrusions 54a of the rear-side link-side engagement pin 54 are inserted slidably into the guide grooves 42 and 47 of both of the rear-side guide members 40 and 45, respectively. Accordingly, the movements of both of the rear-side links 51 and 52 (rear-side link member 50) with respect to both of the rear-side guide members 40 and 45 are regulated in the vehicle height direction.

That is, the postures of both of the rear-side links 51 and 52 are controlled by both of the link-side engagement protrusions 53a of the link-side engagement pin 53 which are inserted into both of the guide grooves 41 and 46, respectively, and both of the link-side engagement protrusions 54a of the link-side engagement pin 54 which are inserted into both of the guide grooves 42 and 47, respectively. In this state, the rear-side links 51 and 52 (rear-side link member 50) are interposed between both of the rear-side guide members 40 and 45, and thereby the movement in the vehicle width direction is regulated. Similarly, both of the rear-side guide members 40 and 45 interpose the rear-side links 51 and 52 (rear-side link member 50) therebetween to make a close approach to each other, and thereby the movement in the vehicle width direction is regulated.

Figure 7A:
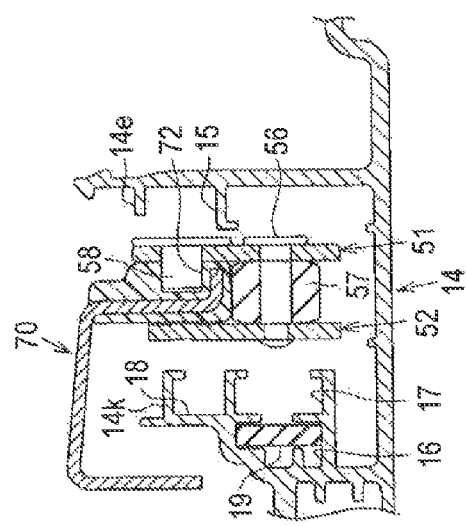
FIGS. 7A, 7B, 7C, and 7D are cross-sectional views taken along line 7A-7A, line 7B-7B, line 7C-7C, and line 7D-7D in FIG. 5, respectively.

As illustrated in FIG. 5, for example, in a completely-closed state of the movable panel 12, both of the link-side engagement protrusions 53a are positioned at front end portions of both of the front-side groove portions 41a and 46a, respectively, and both of the link-side engagement protrusions 54a are positioned at front end portions of both of the guide grooves 42 and 47, respectively. Both of the rear-side links 51 and 52 maintain a front-side down posture to extend along the main bodies 40a and 45a in the front-rear direction. At this time, the front end portions of the rear-side links 51 and 52 are caused to protrude further forward from the front ends of the rear-side guide members 40 and 45. In addition, as illustrated in FIG. 7A, the upper ends of the rear-side links 51 and 52 are caused to protrude further upward from the flange 14e and the support wall portion 14k.

As illustrated in FIGS. 9A and 9B, the lower ends of both of the rear-side links 51 and 52 are connected to each other by a pair of connection pieces 55 that extend in the vehicle width direction at both positions in the front-rear direction where the link-side engagement pin 53 is interposed therebetween, respectively. That is, the rear-side link member 50 is formed as an integral pressed material. In addition, curved portions 51a and 52a for displacing the tips of both of the rear-side links 51 and 52 to the interior side with respect to the base ends thereof are formed at the front end portions of both of the rear-side links 51 and 52, respectively. That is, the front end portion of the rear-side link 52 on the interior side is disposed to allow use of an empty space of the rear-side guide member 45 through the curved portion 52a. In addition, in the front end portions of both of the rear-side links 51 and 52, a degree of curvature of the curved portion 52a on the interior side is set to be greater than a degree of curvature of the curved portion 51a on the interior side such that a separation length in the vehicle width direction is to be greater at the tip than at the base end.

A support pin 56 is supported in the front end portions of both of the rear-side links 51 and 52 to which both of the ends of the support pin 56 are pressed and fixed. A substantially cylindrical roller 57 which is formed of a rubber material is supported in the support pin 56 between both of the rear-side links 51 and 52. In addition, a guide protrusion 58 that protrudes above the roller 57 on the interior side is supported in the rear-side link 51 on the exterior side. The support pin 56 and the roller 57 are disposed further above from both of the curved portions 51a and 52a.

A check member 60 that is interposed between both of the rear-side links 51 and 52 and is formed of, for example, a resin material is rotatably supported in the link-side engagement pin 53. The check member 60 has an arm section 61 that extends rearward from the link-side engagement pin 53 and further above from the link-side engagement pin 54 and a tip end portion 62 that is connected to the rear end protruding further rearward from both of the rear-side links 51 and 52 of the arm section 61 and further extends reward. A part of the tip end portion 62 has a wider width in the vehicle width direction to be equal to the length between opposite end surfaces of both of the rear-side links 51 and 52.

A check-side engagement protrusion 63 protrudes toward the exterior side on the tip end portion 62. As illustrated in FIG. 6C, this check-side engagement protrusion 63 is inserted slidably into the guide groove 43 of the rear-side guide member 40. Accordingly, the movement of the check member 60 with respect to the rear-side guide member 40 in the vehicle height direction is regulated. That is, the posture of the check member 60 is controlled by the check-side engagement protrusion 63 that is inserted into the guide groove 43 and the link-side engagement pin 53.

As illustrated in FIG. 5, for example, in the completely-closed state of the movable panel 12, the check-side engagement protrusion 63 is disposed at the front end portion of the front-side groove portion 43a. The check member 60 maintains a posture and extends along the main bodies 40a and 45a in the front-rear direction.

In addition, as illustrated in FIGS. 6D and 9B, a check-side guide concave portion 64 which is receded toward the exterior side of the tip end portion 62 from the interior side thereof is formed at the tip end portion 62. The check-side guide concave portion 64 has an upper-side groove portion 64a that extends in the vehicle height direction and a sloped groove portion 64b that is connected to the lower end of the upper-side groove portion 64a and extends diagonally toward the lower rear side. The upper end of the upper-side groove portion 64a is blocked and the rear end of the sloped groove portion 64b is opened.

Figure 10:
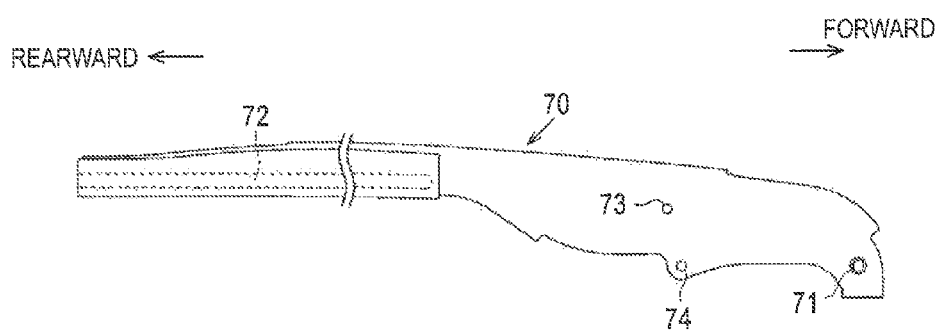
FIG. 10 is a side view illustrating a support bracket when viewed from the exterior side in the vehicle width direction.

As illustrated in FIGS. 5 and 7A, a support bracket 70 that is fixed to the lower surface of the movable panel 12 is supported in both of the rear-side links 51 and 52. That is, as illustrated along with in FIG. 10, the support bracket 70 is molded to have a substantially lengthy shape extending in the front-rear direction. In the support bracket 70, a pin-like support protrusion 71 protrudes toward the exterior side from the front portion thereof and a bracket-side guide groove 72 that is receded toward the interior side from the exterior side rearward from the support protrusion 71 and extends in the front-rear direction is formed. The guide protrusion 58 is inserted into and supported by the bracket-side guide groove 72, and thereby the movement of the support bracket 70 is regulated with respect to both of the rear-side links 51 and 52 (rear-side link member 50) in the vehicle height direction and a rearward posture from the support protrusion 71 is controlled. In this state, the support bracket 70 is interposed between both of the rear-side links 51 and 52 and the movement thereof is regulated in the vehicle width direction. That is, the support bracket 70 is interposed by the tips of both of the rear-side links 51 and 52 which are separated in the vehicle width direction through the curved portions 51a and 52a.

Figure 7B:
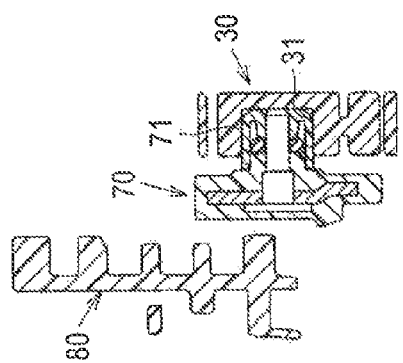

As illustrated in FIGS. 5 and 7B, the support protrusion 71 is inserted into and supported by the guide groove 31 and is positioned at the lower end thereof in the completely-closed state of the movable panel 12. The support protrusion 71 is capable of entering the first rail section 15 from the guide groove 31 in accordance with the rearward movement of the support bracket 70. That is, the support protrusion 71 is inserted into and supported by the guide groove 31 or the first rail section 15, and thereby the posture of the front portion of the support bracket 70 is controlled. To be more specific, the support wall portion 14d that regulates the upward movement of the rear-side guide member 40 as described above has another function of regulating the downward movement of the support protrusion 71 in the movement state of the support bracket 70. Otherwise, the flange 14e that regulates the upward movement of the rear-side guide member 40 has an additional function of regulating the upward movement of the support protrusion 71 in the movement state of the support bracket 70.

Thus, the support protrusion 71 is positioned at the lower end of the guide groove 31, for example, in the completely-closed state of the movable panel 12 and the guide protrusion 58 is disposed at the rear end portion of the bracket-side guide groove 72. Accordingly, the support bracket 70 maintains the posture of extending along the guide rail 14 in the front-rear direction.

In addition, as is clear with reference to along with FIGS. 6A, 6B, and 7B, the guide grooves 41 and 42 of the rear-side guide member 40 and the support protrusion 71 (guide groove 31) are disposed to be overlapped with each other at a position in the vehicle width direction when viewed in the front-rear direction. That is, the guide grooves 41 and 42 and the support protrusion 71 are disposed to share a space in the vehicle width direction when viewed in the front-rear direction.

As illustrated in FIGS. 3 and 5, the support bracket 70 has a shoe portion 75 extending to the interior side from the lower front end thereof. The shoe portion 75 is positioned further forward from the front end of the guide rail 14, for example, in the completely-closed state of the movable panel 12 and avoids interference with the guide rail 14. In addition, in a state in which the support protrusion 71 enters the first rail section 15, the shoe portion 75 is to enter the third rail section 17. That is, the posture of the front portion of the support bracket 70 is controlled by cooperation of the support protrusion 71 which is supported by the first rail section 15 with the shoe portion 75 which is supported by the third rail section 17.

In the support bracket 70, a first engagement protrusion 73 and a second engagement protrusion 74 protrude toward the interior side at a position in the front-rear direction where the first and second engagement protrusions are interposed between the support protrusion 71 and the bracket-side guide groove 72. The second engagement protrusion 74 is disposed downward from the first engagement protrusion 73.

As illustrated in FIGS. 3 and 6A to 6D, a substantial band-like driving belt 19 that is formed of, for example, a resin material is supported slidably in the front-rear direction in the second rail section 16 of the guide rail 14. The driving belt 19 is connected to an electric driving source (not illustrated) such as an electric motor and is driven to move along the second rail section 16 in the front-rear direction by using the electric driving source.

Figure 11:
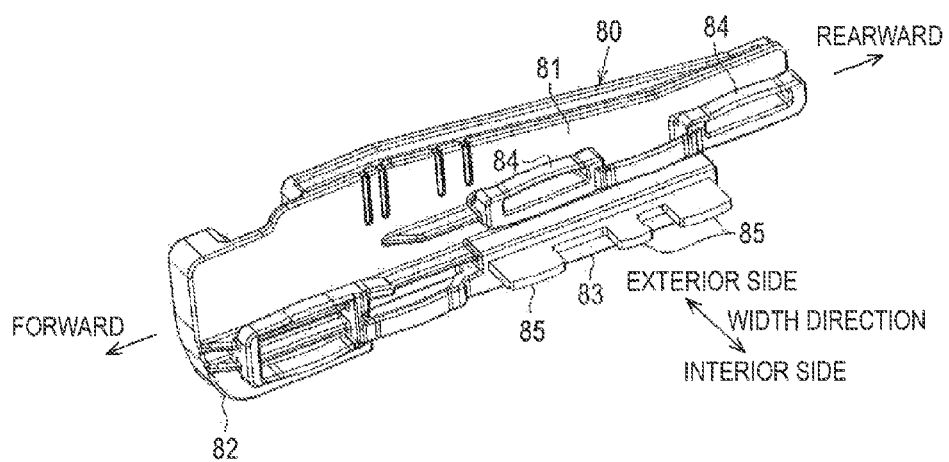
FIG. 11 is a perspective view illustrating a front-side driving shoe.

As illustrated in FIG. 5, a front-side driving shoe 80 is supported slidably in the front-rear direction in front of the rear-side guide member 45 in the guide rail 14. That is, as illustrated along with in FIG. 11, the front-side driving shoe 80 has a main body 81 that extends in the front-rear direction and is fitted into the lower side of the movable panel 12 that is in the completely-closed state or the like and a substantially L-shaped extension portion 82 that extends in a front-lower direction along a corner of the lower front end of the main body 81. In the front-side driving shoe 80, a sliding protrusion 83 protrudes toward the interior side from the interior side surface of the main body 81 which is disposed rearward form the extension portion 82 and a pair of front and rear sliding protrusions 84 protrude toward the interior side from the interior side surface of the main body 81 above the sliding protrusion 83.

Figure 7C:
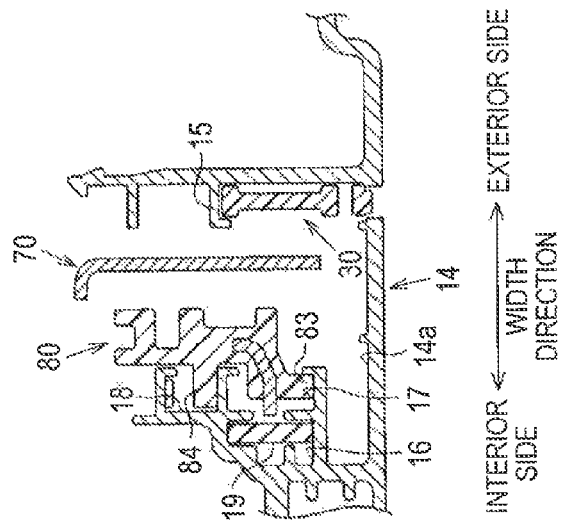
Figure 7D:
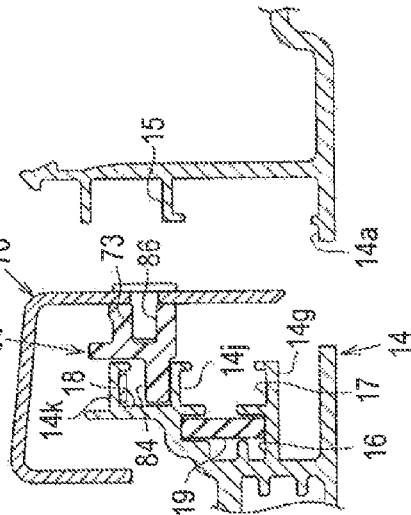

As illustrated in FIGS. 7C and 7D, in a state in which the extension portion 82 is disposed on the bottom wall 14a, the front-side driving shoe 80 is disposed to be adjacent to the exterior side of the support wall portion 14g or the like, the sliding protrusions 83 and 84 are inserted into the third and fourth rail sections 17 and 18, respectively, and thereby the front-side driving shoe 80 is supported slidably in the front-rear direction with respect to the guide rail 14.

On the front-side driving shoe 80, a plurality of (three) linking pieces 85 protrudes toward the interior side in a range of the sliding protrusion 83 in the front-rear direction. These linking pieces 85 are provided side by side in the front-rear direction and the tips thereof enter the second rail section 16 from the third rail section 17 and are linked to the driving belt 19. The front-side driving shoe 80 is interlocked with the driving belt 19 that moves in the front-rear direction so as to move in the front-rear direction.

Figure 12:
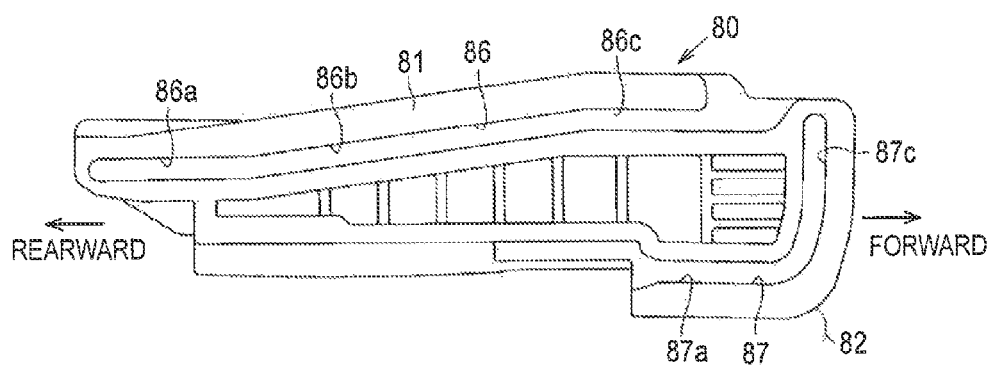
FIG. 12 is a side view of the front-side driving shoe when viewed from the exterior side in the vehicle width direction.

As illustrated in FIG. 12, in the front-side driving shoe 80, a long groove-like first driving shoe-side groove portion 86 is formed as a first driving shoe-side concave portion that is receded toward the interior side from an upper exterior side surface of the main body 81. The first driving shoe-side groove portion 86 has a rear-side groove portion 86a that extends in the front-rear direction, a sloped groove portion 86b that is connected to the front end of the rear-side groove portion 86a and extends diagonally toward the upper front side, and a front-side groove portion 86c that is connected to the front end of the sloped groove portion 86b and extends in the front-rear direction. The rear end of the rear-side groove portion 86a is blocked and the front end of the front-side groove portion 86c is opened.

Thus, as illustrated in FIGS. 5 and 7D, in the completely-closed state of the movable panel 12, the first engagement protrusion 73 of the support bracket 70 is inserted into and supported by the rear end of the first driving shoe-side groove portion 86. The front-side driving shoe 80 causes the first driving shoe-side groove portion 86 to slide to the first engagement protrusion 73 in accordance with the rearward movement thereof, and thereby to rotate about the support protrusion 71 of the support bracket 70. Otherwise, the front-side driving shoe 80 causes the first engagement protrusion 73 to be separated from the front end of the first driving shoe-side groove portion 86 in accordance with the further rearward movement thereof and thereby causes the support protrusion 71 to enter the first rail section 15 from the guide groove 31 of the front-side guide member 30.

As illustrated in FIG. 12, in the front-side driving shoe 80, a substantial L-shaped second driving shoe-side groove portion 87 that is formed along the extension portion 82 is formed as a second driving shoe-side concave portion that is receded toward the interior side from an exterior side surface of the extension portion 82. The second driving shoe-side groove portion 87 has a rear-side groove portion 87a that extends in the front-rear direction and a vertical groove portion 87b that is connected to the front end of the rear-side groove portion 87a and extends upward. The rear end of the rear-side groove portion 87a is opened and the top end of the vertical groove portion 87b is blocked.

Thus, as illustrated in FIG. 5, in the completely-closed state of the movable panel 12, the second driving shoe-side groove portion 87 is disposed forward from the second engagement protrusion 74 of the support bracket 70. The front-side driving shoe 80 causes the second driving shoe-side groove portion 87 to slide to the second engagement protrusion 74 at which the second driving shoe-side groove portion 87 arrives in accordance with the rearward movement thereof, and thereby to rotate about the support protrusion 71 of the support bracket 70. Otherwise, the front-side driving shoe 80 causes the second engagement protrusion 74 to enter the vertical groove portion 87b from the rear-side groove portion 87a in accordance with the further rearward movement and thereby the support protrusion 71 to enter the first rail section 15 from the guide groove 31 of the front-side guide member 30. When the second engagement protrusion 74 reaches the vertical groove portion 87b, the support bracket 70 can move integrally with the front-side driving shoe 80 in the front-rear direction. In addition, in a state in which the support protrusion 71 enters the first rail section 15, the second engagement protrusion 74 is to reach the top end of the vertical groove portion 87b.

A part of the rear-side groove portion 87a is disposed on the lower side of the front-side groove portion 86c so as to have the same position as each other in the front-rear direction when viewed from the vehicle width direction of the front-side groove portion 86c of the first driving shoe-side groove portion 86. In addition, as is clear with reference to along with FIGS. 6A, 6B, and 7D, the guide grooves 46 and 47 of the rear-side guide member 45 and the first driving shoe-side groove portion 86 of the front-side driving shoe 80 are disposed to be overlapped with each other at a position in the vehicle width direction when viewed in the front-rear direction. That is, the guide grooves 46 and 47 and the first driving shoe-side groove portion 86 are disposed to share a space in the vehicle width direction when viewed in the front-rear direction. The guide grooves 46 and 47 and the second driving shoe-side groove portion 87 have the same dispositional relationship.

Figure 13:
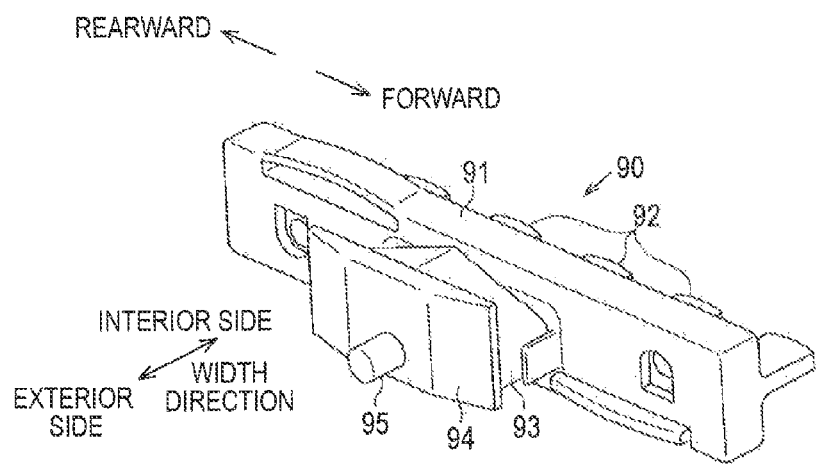
FIG. 13 is a perspective view illustrating a rear-side driving shoe.

As illustrated in FIGS. 5, 6C and 6D, in the third rail section 17 of the guide rail 14, the rear-side driving shoe 90 is supported slidably in the front-rear direction rearward from the rear-side link 51. That is, as illustrated along with in FIG. 13, a rear-side driving shoe 90 has a substantial band-like main body 91 that extends in the front-rear direction and is supported slidably by the third rail section 17 in the main body 91.

A plurality of (five) linking pieces 92 protrudes toward the interior side in the main body 91. These linking pieces 92 are provided side by side in the front-rear direction and the tips thereof enter the second rail section 16 from the third rail section 17 and are linked to the driving belt 19. The rear-side driving shoe 90 is interlocked with the driving belt 19 that moves in the front-rear direction so as to move in the front-rear direction.

In addition, at the central portion of the main body 91 in the front-rear direction, a column-like connection piece 93 protrudes toward the exterior side from above the main body 45a of the rear-side guide member 45 and rearward from the upright portion 45b and a flange-like holding piece 94 is connected to the tip of the connection piece 93. The rear-side driving shoe 90 can allow the connection piece 93 to slide on the main body 45a in a state in which the main body 45a of the rear-side guide member 45 is interposed between the main body 91 and the holding piece 94.

At the central portion of the holding piece 94, a driving shoe-side guide protrusion 95 protrudes toward the exterior side from the exterior side surface thereof. For example, in the completely-closed state of the movable panel 12, the driving shoe-side guide protrusion 95 is disposed in the upper-side groove portion 64a of the check member 60. When the rear-side driving shoe 90 moves rearward, the check member 60 in which the inner wall surface of the upper-side groove portion 64a is pressed against the driving shoe-side guide protrusion 95 causes the check-side engagement protrusion 63 to slide to the front-side groove portion 43a of the rear-side guide member 40 and to move rearward integrally with the rear-side links 51 and 52 (rear-side link member 50).

In addition, when the check-side engagement protrusion 63 reaches the rear-side groove portion 43b of the rear-side guide member 40 in accordance with the rearward movement of the check member 60, the driving shoe-side guide protrusion 95 guides the sloped groove portion 64b in accordance with the upward movement of the tip end portion 62 and releases the check member 60. The rear-side driving shoe 90 moves reward with the rear-side links 51 and 52 (rear-side link member 50) and the check member 60 remaining at their positions.

Next, the effect of the present embodiment will be described.

As illustrated in FIG. 5, it is described that, when the movable panel 12 is in the completely-closed state, the front-side driving shoe 80 and the rear-side driving shoe 90 move rearward along with the driving belt 19. At this time, the support protrusion 71 is inserted into the guide groove 31 and thereby the movement of the front portion of the support bracket 70 is regulated in the front-rear direction and the first engagement protrusion 73 is inserted into the first driving shoe-side groove portion 86 and thereby only the upward rotation about the support protrusion 71 is allowed in accordance with the rearward movement of the front-side driving shoe 80. Meanwhile, the inner wall surface of the check-side guide concave portion 64 (upper-side groove portion 64a) is pressed against the driving shoe-side guide protrusion 95 and thereby the check member 60 moves rearward integrally with the rear-side driving shoe 90. Thus, both of the link-side engagement protrusions 53a slide into both of the guide grooves 41 and 46, respectively, both of the link-side engagement protrusions 54a slide into both of the guide grooves 42 and 47, respectively, and thereby both of the rear-side links 51 and 52 which move rearward along with the check member 60 move rearward and rotate such that the front end portion is lifted about the link-side engagement pin 54. In addition, the check-side engagement protrusion 63 that slides in the guide groove 43 enters the rear-side groove portion 43b from the front-side groove portion 43a and thereby the check member 60 in which the arm section 61 is lifted along with the link-side engagement pin 53 moves upward such that the tip end portion 62 is lifted and the check member 60 extends in the front-rear direction as a whole. At this time, the inner wall surface of the check-side guide concave portion 64 deviates from a rearward movement track of the driving shoe-side guide protrusion 95 and thereby the check member 60 disengages from the rear-side driving shoe 90. However, the inner wall surface of the check-side guide concave portion 64 is configured not to deviate from a forward movement track of the driving shoe-side guide protrusion 95.

As illustrated by a change from FIG. 5 to FIG. 14, when the amount of rearward movement M of the front-side driving shoe 80 and the rear-side driving shoe 90 with the completely-closed state of the movable panel 12 as the starting point is less than the predetermined amount Mc, the support bracket 70 lifts the rear portion supported by both of the rear-side links 51 and 52 and rotates about the support protrusion 71. Thus, the movable panel 12 supported by the support bracket 70 enters into the tilted up state.

Figure 15A:
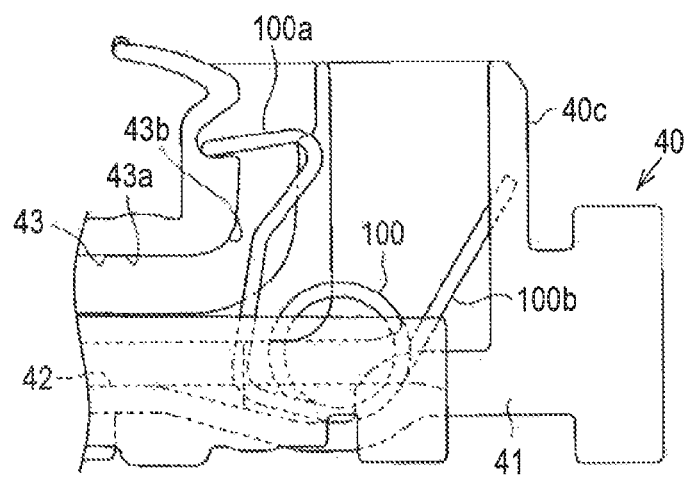
FIGS. 15A and 15B are side views illustrating an operation of the embodiment.
Figure 15B:
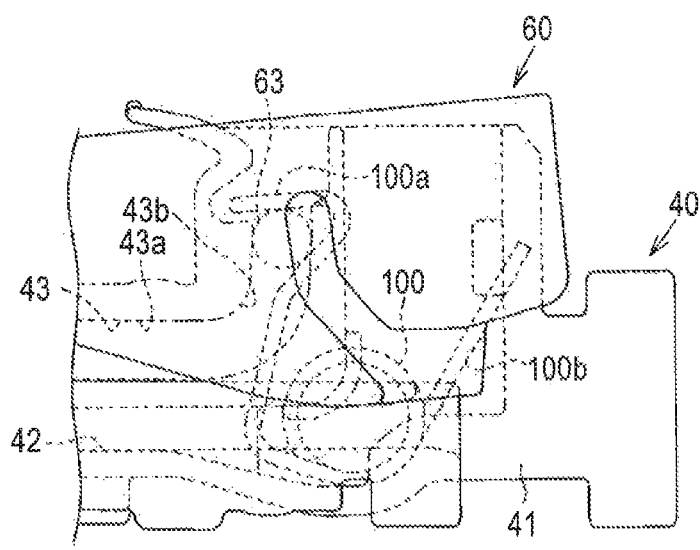

In the tilted up state of the movable panel 12, the rear end of the extension portion 82 passes through the second engagement protrusion 74 and thereby the second engagement protrusion 74 is inserted into and supported by the rear-side groove portion 87a of the second driving shoe-side groove portion 87. In addition, as illustrated in FIGS. 15A and 15B, a holding spring 100 that is formed of, for example, a torsion spring is mounted in the rear-side guide member 40 and rearward from the guide groove 42. Both terminals 100a and 100b of the holding spring 100 extend diagonally toward the upper front side and upper rear side, respectively and are sealed by the upright portion 40c. In addition, the terminal 100a that extends diagonally toward the upper front side is molded to be curved such that the upward movement track of the check-side engagement protrusion 63 along the rear-side groove portion 43b is blocked. Thus, the upward movement of the check-side engagement protrusion 63 along the rear-side groove portion 43b is regulated elastically by the terminal 100a. Accordingly, the check-side engagement protrusion 63 is prevented from escaping upward off the rear-side groove portion 43b.

Subsequently, in the tilted up state of the movable panel 12, the front-side driving shoe 80 and the rear-side driving shoe 90 move further rearward along with the driving belt 19. At this time, when the front end of the first driving shoe-side groove portion 86 reaches the first engagement protrusion 73, the vertical groove portion 87b reaches the second engagement protrusion 74 and thereby the front portion of the support bracket 70 is only allowed to move upward with respect to the front-side driving shoe 80. Thus, the front portion of the support bracket 70 moves upward while lifting the support protrusion 71 that is guided by the guide groove 31 in accordance with the reward movement of the front-side driving shoe 80.

At this time, the support bracket 70 substantially maintains the position of the rear portion in the vehicle height direction which is supported by both of the rear-side links 51 and 52, causes the support protrusion 71 to enter the first rail section 15 from the guide groove 31 and the shoe portion 75 to enter the third rail section 17 and the front portion of the support bracket 70 moves upward. Thus, the movable panel 12 that is supported by the support bracket 70 is to have a pop-up state.

In the pop-up state of the movable panel 12, the second engagement protrusion 74 reaches the top end of the vertical groove portion 87b and the movement of the support bracket 70 is regulated with respect to the front-side driving shoe 80 in the front-rear direction.

Subsequently, in the pop-up state of the movable panel 12, the front-side driving shoe 80 and the rear-side driving shoe 90 move further rearward along with the driving belt 19. At this time, the support bracket 70 in which the second engagement protrusion 74 is pressed against the inner wall surface of the vertical groove portion 87b moves rearward integrally with the front-side driving shoe 80. Thus, as illustrated by a change from FIG. 14 to FIG. 16, the movable panel 12 supported by the support bracket 70 performs the opening operation while maintaining the pop-up state and is to have the wide-open state.

At this time, as illustrated in FIG. 17A, the support bracket 70 causes the support protrusion 71 and the shoe portion 75 to slide to the first and third rail sections 15 and 17 and moves rearward. As illustrated in FIG. 17B, the first engagement protrusion 73 detached from the first driving shoe-side groove portion 86 moves rearward above the front-side driving shoe 80.

Meanwhile, as illustrated in FIGS. 17C and 17D, the support bracket 70 causes the bracket-side guide groove 72 to slide to the guide protrusion 58 of the rear-side link 51 while maintaining posture with respect to the rear-side guide members 40 and 45 by the link-side engagement pins 53 and 54 and moves rearward. In the pop-up state of the movable panel 12, the roller 57 comes into contact with the lower end of the support bracket 70, and thereby a backlash of the rear portion is suppressed.

As is clear with reference to along with FIGS. 5 and 16, in the completely-closed state of the movable panel 12, a position where the link-side engagement protrusion 53a of the guide groove 46 (front-side groove portion 46a) is engaged is disposed below the main body 81 of the front-side driving shoe 80 in the wide-open state of the movable panel 12, that is, below the first driving shoe-side groove portion 86. That is, in the wide-open state of the movable panel 12, the guide groove 46 and the first driving shoe-side groove portion 86 are disposed to share a space in the front-rear direction when viewed in the vehicle width direction. The guide groove 46 and the first driving shoe-side groove portion 88 are disposed to share a space in the vehicle width direction when viewed in the front-rear direction, which is as described above.

Next, in an opening state (pop-up state) of the movable panel 12, the front-side driving shoe 80 and the rear-side driving shoe 90 move forward along with the driving belt 19. At this time, the support bracket 70 in which the second engagement protrusion 74 is pressed against the inner wall surface of the vertical groove portion 87b moves forward integrally with the front-side driving shoe 80. Thus, the movable panel 12 supported by the support bracket 70 performs the closing operation while maintaining the pop-up state. The movement state of the support bracket 70 at this time is the same as described above except that "rearward" is replaced with "forward".

Figure 14:
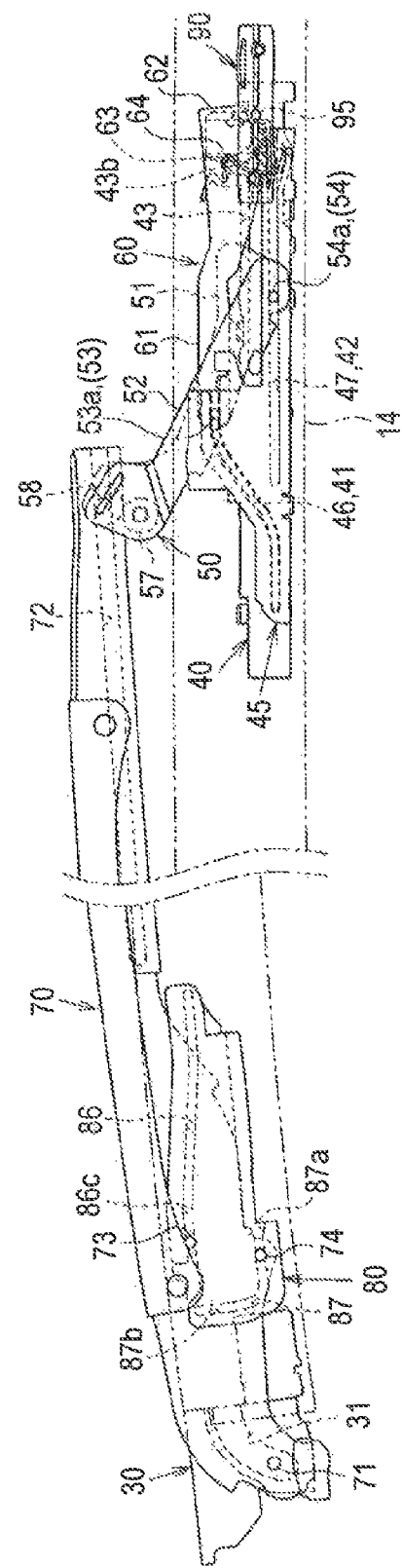
FIG. 14 is a side view illustrating the embodiment in a tilted up state of the movable panel when viewed from the interior side in the vehicle width direction.
Figure 16:
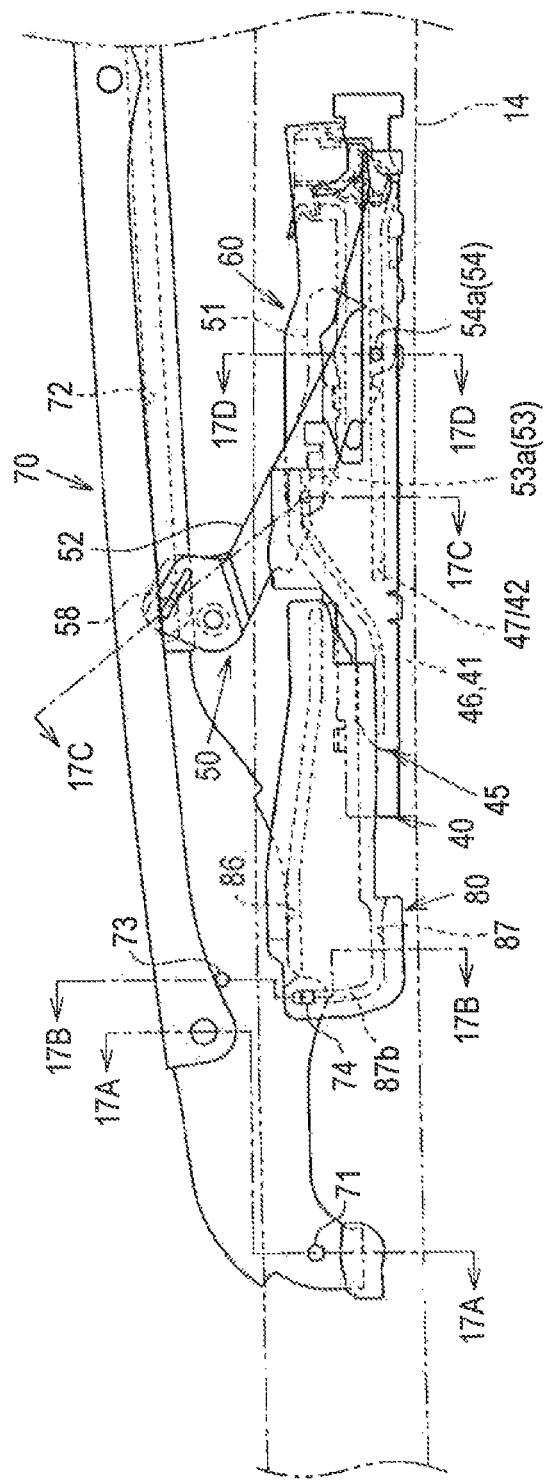
FIG. 16 is a side view illustrating the embodiment in a wide-open state of the movable panel when viewed from the interior side in the vehicle width direction.

When the amount of the movement M approximates the predetermined amount Mc, as illustrated by a change from FIG. 16 to FIG. 14, the support bracket 70 substantially maintains the position of the rear portion in the vehicle height direction which is supported by both of the rear-side links 51 and 52, causes the support protrusion 71 to enter the guide groove 31 from the first rail section 15 and the shoe portion 75 to be detached from the third rail section 17 and the front portion of the support bracket 70 moves downward. Thus, the movable panel 12 that is supported by the support bracket 70 is to have a tilted up state. At this time, the front-side driving shoe 80 causes the first engagement protrusion 73 of the support bracket 70 to enter the front-side groove portion 86c of the first driving shoe-side groove portion 86 in accordance with the forward movement, and the second engagement protrusion 74 to enter the rear-side groove portion 87a from the vertical groove portion 87b. Accordingly, the front portion of the support bracket 70 is only allowed to rotate downward about the support protrusion 71 in accordance with the forward movement of the front-side driving shoe 80. Meanwhile, the rear-side driving shoe 90 causes the driving shoe-side guide protrusion 95 to approach the check-side guide concave portion 64 of the check member 60 in accordance with the forward movement.

Subsequently, in the tilted up state of the movable panel 12, the front-side driving shoe 80 and the rear-side driving shoe 90 move further forward along with the driving belt 19. At this time, the inner wall surface of the check-side guide concave portion 64 (sloped groove portion 64b) is pressed against the driving shoe-side guide protrusion 95 and thereby the check member 60 moves forward integrally with the rear-side driving shoe 90. Thus, both of the link-side engagement protrusions 53a slide into both of the guide grooves 41 and 46, respectively, both of the link-side engagement protrusions 54a slide into both of the guide grooves 42 and 47, respectively, and thereby both of the rear-side links 51 and 52 which move forward along with the check member 60 move forward and rotate such that the front end portion descends about the link-side engagement pin 54. In addition, the check-side engagement protrusion 63 that slides into the guide groove 43 enters the front-side groove portion 43a from the rear-side groove portion 43b and thereby the check member 60 in which the arm section 61 descends along with the link-side engagement pin 53 moves downward such that the tip end portion 62 descends and the check member 60 extends in the front-rear direction as a whole. Thus, the check member 60 engages with the rear-side driving shoe 90 such that the inner wall surface of the check-side guide concave portion 64 blocks the rearward movement track of the driving shoe-side guide protrusion 95.

As illustrated by a change from FIG. 14 to FIG. 5, the support bracket 70 causes the rear portion that is supported by both of the rear-side links 51 and 52 to descend and rotate about the support protrusion 71. Thus, the movable panel 12 that is supported by the support bracket 70 is to have a completely-closed state.

As described above, according to the present embodiment, the following effects are achieved.

(1) According to the present embodiment, the front-side driving shoe 80 and the rear-side guide member 45 are disposed in a state in which the first and second driving shoe-side groove portions 86 and 87 and the guide grooves 46 and 47 are overlapped with each other at a position in the width direction, that is, a state of sharing a space in the width direction. Therefore, it is possible to suppress an increase in the size of the guide rail 14 in the width direction. In addition, in the front-side driving shoe 80 and the rear-side guide member 45, a part of the guide groove 46 with which the link-side engagement protrusion 53a engages in a completely-closed state of the movable panel 12 is disposed below the first driving shoe-side groove portion 86 in a wide-open state of the movable panel 12. Therefore, interference between the front-side driving shoe 80 and the rear-side guide member 45 is prevented and also it is possible to suppress an increase in the size of the entire apparatus in the vehicle height direction. In particular, the first driving shoe-side groove portion 86 for allowing the rear portion of the support bracket 70 to be lifted up and lowered and the second driving shoe-side groove portion 87 for causing the front portion of the support bracket 70 to be lifted up and lowered and the support bracket 70 to move integrally with the driving shoe in the vehicle front-rear direction are independently formed from each other on the front-side driving shoe 80. Therefore, it is possible to simultaneously reduce the dimensions required for the first driving shoe-side groove portion 86 and the second driving shoe-side groove portion 87 in the vehicle height direction and thus, it is possible to further miniaturize the front-side driving shoe 80 in the vehicle height direction.

(2) According to the present embodiment, the first driving shoe-side groove portion 86 in the wide-open state of the movable panel 12 is disposed above the portion of the guide groove 46 with which the link-side engagement protrusion 53a engages. The guide groove 46 slopes toward a vehicle forward direction, that is, downward in the vehicle height direction along in the vicinity of the front-side driving shoe 80. Accordingly, it is possible to dispose the first driving shoe-side groove portion 86 in the wide-open state of the movable panel 12 so as to be more easily shifted in the vehicle height direction with respect to a part of the guide groove 46 with which the link-side engagement protrusion 53a engages.

(3) According to the present embodiment, in the opening state (tilt-up state or the like) of the movable panel 12, a structure held on both sides is obtained, in which both of the rear-side links 51 and 52 are held by both of the rear-side guide members 40 and 45 and thus it is possible to suppress rocking of the movable panel 12 that is supported on the rear-side links 51 and 52 through the support bracket 70. Meanwhile, the guide grooves 41 and 42 of the rear-side guide member 40 and the support protrusion 71 are disposed in a state of being overlapped with each other at a position in the vehicle width direction when viewed in the front-rear direction, that is, a state of sharing a space in the width direction. Therefore, the holding rigidity of the rear-side links 51 and 52 by the rear-side guide members 40 and 45 is improved and also it is possible to suppress an increase in the size of the guide rail 14 in the vehicle width direction.

(4) According to the present embodiment, the support wall portions 14g, 14j, and 14k are in a state of not extending above the guide grooves 46 and 47 of the rear-side guide member 45 in the vehicle width direction, and thereby it is possible to suppress an increase in the size of the guide rail 14 in the width direction to an equivalent degree. In addition, as illustrated in FIG. 17C, of the support wall portions 14g, 14j, and 14k, the uppermost support wall portion 14k is in a state of not extending to the highest position of the guide groove 46 in the vehicle height direction, that is, above the guide groove 46 of the upright portion 45b, and thereby it is possible to suppress an increase in the size of the guide rail 14 in the vehicle height direction to an equivalent degree. Meanwhile, the support wall portion 14d and the flange 14e are in a state of extending above the guide grooves 41 to 43 of the rear-side guide member 40 in the vehicle width direction, and thereby it is possible to increase the holding rigidity of the rear-side guide member 40 in the vehicle height direction to an equivalent degree.

(5) According to the present embodiment, in the movement state of the support bracket 70, the support wall portion 14d is configured to regulate the downward movement of the support protrusion 71, and the flange 14e is configured to regulate the upward movement of the support protrusion 71. Accordingly, it is possible to more reliably regulate the movement of the support protrusion 71 in the vehicle height direction with the support wall portion 14d or the flange 14e that has a greater engagement zone with the rear-side guide member 40 compared to the support wall portions 14g and 14j.

(6) According to the present embodiment, the front portion of the support bracket 70 engages directly with the front-side driving shoe 80, and thus it is possible to reduce the number of components compared to a case, for example, in which another member (front-side link in the related art) is interposed therebetween.

(7) According to the present embodiment, in the front-side driving shoe 80 and the rear-side guide member 45, the part of the guide groove 46 with which the link-side engagement protrusion 53a engages in the completely-closed state of the movable panel 12 is disposed below the first driving shoe-side groove portion 86 in the vehicle height direction in the wide-open state of the movable panel 12. Therefore, it is possible to raise the amount of the rearward movement M of the front-side driving shoe 80 with the rear-side guide member 45, and it is possible to appropriately secure an amount of the opening of the movable panel 12.

The embodiment described above may be modified as follows.

According to the embodiment described above, both of the link-side engagement protrusions 53a may be provided individually on both of the rear-side links 51 and 52, respectively. That is, both of the link-side engagement protrusions 53a may not be configured to have a single link-side engagement pin 53. Similarly, both of the link-side engagement protrusions 54a may be provided individually on both of the rear-side links 51 and 52, respectively. That is, both of the link-side engagement protrusions 54a may not be configured to have a single link-side engagement pin 54.

According to the embodiment described above, both of the rear-side links 51 and 52 may be members separate from each other. That is, both of the rear-side links 51 and 52 do not necessarily have to be formed as an integral pressed material.

According to the embodiment described above, the rear-side link member 50 may be configured to have a single rear-side link.

According to the embodiment described above, in the movement state of the support bracket 70, the regulation of the downward or upward movement of the support protrusion 71 by the guide rail 14 may be performed at a portion other than the support wall portion 14d or the flange 14e (first rail section 15). For example, in a case where a support protrusion that protrudes to the interior side is employed, in the movement state of the support bracket 70, the regulation of the downward or upward movement of the support protrusion 71 by the guide rail 14 may be performed by the support wall portions 14g, 14j, and 14k (third rail section 17 or fourth rail section 18).

According to the embodiment described above, the support wall portions 14g, 14j, and 14k may be in a state of extending above the guide grooves 46 and 47 of the rear-side guide member 45 in the vehicle width direction. Otherwise, of the support wall portions 14g, 14j, and 14k, the uppermost support wall portion 14k may be in a state of extending to the highest position of the guide groove 46 in the vehicle height direction, that is, above the guide groove 46 of the upright portion 45b. Meanwhile, the support wall portion 14d and the flange 14e may be in a state of not extending above the guide grooves 41 to 43 of the rear-side guide member 40 in the vehicle width direction. Otherwise, the flange 14e may be in a state of not extending to the uppermost position of the guide groove 41 in the vehicle height direction, that is, above the guide groove 41 of the slope portion 40b.

According to the embodiment described above, the guide grooves 41 and 42 of the rear-side guide member 40 and the support protrusion 71 may be disposed not to be overlapped with each other at a position in the vehicle width direction when viewed in the front-rear direction.

According to the embodiment described above, in the front-side driving shoe 80 and the rear-side guide member 45, the part of the guide groove 46 with which the link-side engagement protrusion 53a engages in the completely-closed state of the movable panel 12 may be disposed above the first driving shoe-side groove portion 86 in the wide-open state of the movable panel 12.

According to the embodiment described above, the rear-side guide member 40 and a periphery structure thereof may be omitted.

According to the embodiment described above, the front-side driving shoe 80 may be disposed to be closer to the exterior side of the bottom wall 14a. In this case, the part of the guide groove 41 with which the link-side engagement protrusion 53a engages in the completely-closed state of the movable panel 12 may be disposed above or below the first driving shoe-side groove portion 86 in the vehicle height direction in the wide-open state of the movable panel 12. In addition, in such a configuration, the rear-side guide member 45 and the periphery structure thereof may be omitted.

According to the embodiment described above, when interference with the rear-side guide member 45 can be avoided, a single driving shoe not divided into the front and the rear portions may be employed.

According to the embodiment described above, the bracket-side guide groove 72 of the support bracket 70 may be formed on the interior side instead of the exterior side or in addition to the exterior side. In this case, the guide protrusion 58 may be provided on the rear-side link 52 instead of the rear-side link 51 or in addition to the rear-side link 51.

According to the embodiment described above, a movable rear-side guide member that moves along with the movement of the driving shoe in the front-rear direction may be employed.

According to the embodiment described above, the movement direction of the driving shoe and the operation direction of the rear-side link may have an inverse relationship with each other.

According to the embodiment described above, a configuration may be employed in which, without the fixed panel 13, only the movable panel 12 closes and opens the entire opening 11.

Next, technical ideas that can be understood by the embodiments described above and other examples are described as follows.

(A) According to the above-described sunroof apparatus, a sunroof apparatus includes the second regulation piece that is configured to regulate the movement of the support protrusion in the movement state of the support bracket in the vehicle height direction.

In this configuration, it is possible to more reliably regulate the movement of the support protrusion in the vehicle height direction with the second regulation piece that has a greater engagement zone with the rear-side guide member (second rear-side guide member) than the first regulation piece.

An aspect of this disclosure is directed to a sunroof apparatus including: a movable panel that is adjusted to open and close an opening formed on a roof of a vehicle; a guide rail that extends on the roof in the vehicle front-rear direction; a driving shoe that is driven to move along the guide rail; a support bracket that includes a first engagement protrusion and a second engagement protrusion and supports the movable panel; a rear-side guide member on which a guide-side engagement concave portion is formed and which is provided on the guide rail; and a rear-side link from which a link-side engagement protrusion which engages with the guide-side engagement concave portion to lift up and lower the rear portion of the support bracket protrudes in the vehicle width direction. On the driving shoe, a first driving shoe-side engagement concave portion that is capable of engaging with the first engagement protrusion to allow the rear portion of the support bracket to be lifted up and lowered and a second driving shoe-side engagement concave portion that is capable of engaging with the second engagement protrusion to cause the front portion of the support bracket to be lifted up and lowered and the support bracket to move integrally with the driving shoe in the vehicle front-rear direction are formed. The first and second driving shoe-side engagement concave portions and the guide-side engagement concave portion are overlapped with each other at a position in the width direction and a part of the guide-side engagement concave portion with which the link-side engagement protrusion engages in a completely-closed state of the movable panel is disposed above or below the first driving shoe-side engagement concave portion in the vehicle height direction in a wide-open state of the movable panel.

In this configuration, the driving shoe and the rear-side guide member are disposed in a state in which the first and second driving shoe-side engagement concave portions and the guide-side engagement concave portions are overlapped with each other at a position in the width direction, that is, a state of sharing a space in the width direction. Therefore, it is possible to suppress an increase in the size of the guide rail in the width direction. In addition, in the driving shoe and the rear-side guide member, a part of the guide-side engagement concave portion with which the link-side engagement protrusion engages in a completely-closed state of the movable panel is disposed above or below the first driving shoe-side engagement concave portion in the vehicle height direction in a wide-open state of the movable panel. Therefore, interference between the driving shoe and the rear-side guide member is prevented and also it is possible to suppress an increase in the size of the entire apparatus in the vehicle height direction. In particular, the first driving shoe-side engagement concave portion for allowing the rear portion of the support bracket to be lifted up and lowered and the second driving shoe-side engagement concave portion for causing the front portion of the support bracket to be lifted up and lowered and the support bracket to move integrally with the driving shoe in the vehicle front-rear direction are independently formed from each other on the driving shoe. Therefore, it is possible to simultaneously reduce the dimensions required for the first driving shoe-side engagement concave portion and the second driving shoe-side engagement concave portion in the vehicle height direction and thus, it is possible to further miniaturize the driving shoe in the vehicle height direction.

In the sunroof apparatus according to the aspect of this disclosure, it is preferable that a part of the guide-side engagement concave portion with which the link-side engagement protrusion engages in a completely-closed state of the movable panel are disposed below the first driving shoe-side engagement concave portion in the vehicle height direction in a wide-open state of the movable panel.

In this configuration, the first driving shoe-side engagement concave portion in the wide-open state of the movable panel is disposed above the part of the guide-side engagement concave portion with which the link-side engagement protrusion engages. Normally, the guide-side engagement concave portion that engages with the link-side engagement protrusion to lift up and lower the rear portion of the support bracket slopes toward a vehicle front direction, that is, downward in the vehicle height direction along in the vicinity of the driving shoe. Accordingly, it is possible to dispose the first driving shoe-side engagement concave portion in the wide-open state of the movable panel so as to be more easily shifted in the vehicle height direction with respect to a part of the guide-side engagement concave portion with which the link-side engagement protrusion engages.

It is preferable that the sunroof apparatus according to the aspect of this disclosure further includes a second rear-side guide member which is provided on the guide rail to be separated from the rear-side guide member in the width direction and on which a second guide-side engagement concave portion that engages with the link-side engagement protrusion is formed; and a support protrusion that protrudes from the front portion of the support bracket in the width direction, functions as a rotation center of the support bracket when an amount of a movement of the driving shoe in the vehicle front-rear direction with the completely-closed state of the movable panel as a starting point is less than a predetermined amount, and supports the movement of the support bracket when the amount of the movement of the driving shoe is the predetermined amount or greater. It is preferable that the support protrusion and the second guide-side engagement concave portion are disposed to be overlapped with each other at a position in the width direction.

In this configuration, in an opening state (tilt-up state or the like) of the movable panel, a structure held on both sides is obtained, in which the rear-side links are held by both of the rear-side guide members and thus it is possible to suppress rocking of the movable panel that is supported on the rear-side links through the support bracket. Meanwhile, the support protrusion and the second guide-side engagement concave portion are disposed in a state of being overlapped with each other at a position in the width direction, that is, a state of sharing a space in the width direction. Therefore, it is possible to suppress an increase in the size of the guide rail in the width direction.

In the sunroof apparatus according to the aspect of this disclosure, it is preferable that, on the guide rail, a pair of regulation pieces that extend to face each other in the width direction and regulate the upward movements of the rear-side guide member and the second rear-side guide member in the vehicle height direction, respectively, are formed. It is preferable that a first regulation piece that is a one-side regulation piece of both of the regulation pieces is in a state of not extending above the guide-side engagement concave portion of the rear-side guide member in the width direction and a second regulation piece that is different from the first regulation piece of both of the regulation pieces is in a state of extending above the guide-side engagement concave portion of the second rear-side guide member in the width direction.

In this configuration, the first regulation piece is in a state of not extending above the guide-side engagement concave portion of the first rear-side guide member in the width direction, and thereby it is possible to suppress an increase in the size of the guide rail in the width direction to an equivalent degree. Meanwhile, the second regulation piece is in a state of extending above the guide-side engagement concave portion of the second rear-side guide member in the width direction, and thereby it is possible to increase the holding rigidity of the second rear-side guide member in the vehicle height direction to an equivalent degree.

In the sunroof apparatus according to the aspect of this disclosure, it is preferable that the second regulation piece is configured to regulate a movement of the support protrusion in the vehicle height direction in a movement state of the support bracket.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sunroof apparatus comprising:
   a movable panel that is adjusted to open and close an opening formed on a roof of a vehicle;
   a guide rail that extends on the roof in the vehicle front-rear direction;
   a driving shoe that is driven to move along the guide rail;
   a support bracket that includes a first engagement protrusion and a second engagement protrusion and supports the movable panel;
   a rear-side guide member on which a guide-side engagement concave portion is formed and which is provided on the guide rail; and
   a rear-side link from which a link-side engagement protrusion which engages with the guide-side engagement concave portion to lift up and lower the rear portion of the support bracket protrudes in the vehicle width direction,
   wherein, on the driving shoe, a first driving shoe-side engagement concave portion that is capable of engaging with the first engagement protrusion to allow the rear portion of the support bracket to be lifted up and lowered and a second driving shoe-side engagement concave portion that is capable of engaging with the second engagement protrusion to cause the front portion of the support bracket to be lifted up and lowered and to cause the support bracket to move integrally with the support bracket in the vehicle front-rear direction are formed, and
   wherein the first and second driving shoe-side engagement concave portions and the guide-side engagement concave portion are overlapped with each other at a position in the width direction and a part of the guide-side engagement concave portion with which the link-side engagement protrusion engages in a completely-closed state of the movable panel is disposed below the first driving shoe-side engagement concave portion in the vehicle height direction in a wide-open state of the movable panel.

2. The sunroof apparatus according to claim 1, wherein the guide-side engagement concave portion slopes toward a vehicle forward direction.

3. The sunroof apparatus according to claim 1, further comprising:
   a second rear-side guide member which is provided on the guide rail to be separated from the rear-side guide member in the width direction and on which a second guide-side engagement concave portion that engages with the link-side engagement protrusion is formed; and a support protrusion that protrudes from the front portion of the support bracket in the width direction, functions as a rotation center of the support bracket when an amount of a movement of the driving shoe in the vehicle front-rear direction with the completely-closed state of the movable panel as a starting point is less than a predetermined amount, and supports the movement of the support bracket when the amount of the movement of the driving shoe is the predetermined amount or greater, wherein the support protrusion and the second guide-side engagement concave portion are disposed to be overlapped with each other at a position in the width direction.

4. The sunroof apparatus according to claim 2, further comprising:

a second rear-side guide member which is provided on the guide rail to be separated from the rear-side guide member in the width direction and on which a second guide-side engagement concave portion that engages with the link-side engagement protrusion is formed; and a support protrusion that protrudes from the front portion of the support bracket in the width direction, functions as a rotation center of the support bracket when an amount of a movement of the driving shoe in the vehicle front-rear direction with the completely-closed state of the movable panel as a starting point is less than a predetermined amount, and supports the movement of the support bracket when the amount of the movement of the driving shoe is the predetermined amount or greater, wherein the support protrusion and the second guide-side engagement concave portion are disposed to be overlapped with each other at a position in the width direction.

5. The sunroof apparatus according to claim 3, wherein, on the guide rail, a pair of regulation pieces that extend to face each other in the width direction and regulate the upward movements of the rear-side guide member and the second rear-side guide member in the vehicle height direction, respectively, are formed, wherein a first regulation piece that is a one-side regulation piece of both of the regulation pieces is in a state of not extending above the guide-side engagement concave portion of the rear-side guide member in the width direction, and wherein a second regulation piece that is different from the first regulation piece of both of the regulation pieces is in a state of extending above the guide-side engagement concave portion of the second rear-side guide member in the width direction.

6. The sunroof apparatus according to claim 4, wherein, on the guide rail, a pair of regulation pieces that extend to face each other in the width direction and regulate the upward movements of the rear-side guide member and the second rear-side guide member in the vehicle height direction, respectively, are formed, wherein a first regulation piece that is a one-side regulation piece of both of the regulation pieces is in a state of not extending above the guide-side engagement concave portion of the rear-side guide member in the width direction, and wherein a second regulation piece that is different from the first regulation piece of both of the regulation pieces is in a state of extending above the guide-side engagement concave portion of the second rear-side guide member in the width direction.

7. The sunroof apparatus according to claim 5, wherein the second regulation piece is configured to regulate a movement of the support protrusion in the vehicle height direction in a movement state of the support bracket.

8. The sunroof apparatus according to claim 6, wherein the second regulation piece is configured to regulate a movement of the support protrusion in the vehicle height direction in a movement state of the support bracket.

* * * * *